(12) United States Patent
Fukutani et al.

(10) Patent No.: US 9,907,120 B2
(45) Date of Patent: Feb. 27, 2018

(54) CONTROL UNIT OF INDUCTION HEATING UNIT, INDUCTION HEATING SYSTEM, AND METHOD OF CONTROLLING INDUCTION HEATING UNIT

(71) Applicant: NIPPON STEEL & SUMITOMO METAL CORPORATION, Tokyo (JP)

(72) Inventors: Kazuhiko Fukutani, Tokyo (JP); Yasuhiro Mayumi, Tokyo (JP); Toshiya Takechi, Tokyo (JP); Kenji Umetsu, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 72 days.

(21) Appl. No.: 14/968,141

(22) Filed: Dec. 14, 2015

(65) Prior Publication Data

US 2016/0100459 A1 Apr. 7, 2016

Related U.S. Application Data

(62) Division of application No. 13/514,738, filed as application No. PCT/JP2010/070800 on Nov. 22, 2010, now Pat. No. 9,247,590.

(30) Foreign Application Priority Data

Dec. 14, 2009 (JP) .................................. 2009-283255

(51) Int. Cl.
*H05B 6/06* (2006.01)
*C21D 9/60* (2006.01)
(Continued)

(52) U.S. Cl.
CPC ................. *H05B 6/06* (2013.01); *C21D 1/04* (2013.01); *C21D 9/56* (2013.01); *C21D 9/60* (2013.01);
(Continued)

(58) Field of Classification Search
USPC ......................................................... 219/660
See application file for complete search history.

(56) References Cited

U.S. PATENT DOCUMENTS 2,448,008 A 8/1948 Baker
2,448,012 A 8/1948 Baker
(Continued)

FOREIGN PATENT DOCUMENTS

CA 2 703 992 A1 5/2009
EP 2 073 368 A1 6/2009
(Continued)

OTHER PUBLICATIONS

Extended European Search Report dated Nov. 3, 2014, issued in European Patent Application No. 10837412.5.
(Continued)

*Primary Examiner* — Anne M Antonucci
*Assistant Examiner* — Renee LaRose
(74) *Attorney, Agent, or Firm* — Birch, Stewart, Kolasch & Birch, LLP

(57) ABSTRACT

A control unit of an induction heating unit controls AC power output to a heating coil of a transverse type induction heating unit that allows an alternating magnetic field to intersect a sheet surface of a conductive sheet that is being conveyed to inductively heat the conductive sheet. The control unit includes: a magnetic energy recovery switch that outputs AC power to the heating coil; a frequency setting unit that sets an output frequency in response to at least one of the relative permeability, resistivity, and sheet thickness of the conductive sheet; and a gate control unit that controls a switching operation of the magnetic energy recovery switch on the basis of the output frequency set by the frequency setting unit.

10 Claims, 12 Drawing Sheets

(51) Int. Cl.
 *C21D 11/00* (2006.01)
 *H05B 6/36* (2006.01)
 *C21D 9/56* (2006.01)
 *C21D 1/04* (2006.01)
 *H05B 6/10* (2006.01)
 *H05B 6/04* (2006.01)
 *C21D 1/42* (2006.01)

(52) U.S. Cl.
 CPC ............... *C21D 11/00* (2013.01); *H05B 6/04* (2013.01); *H05B 6/10* (2013.01); *H05B 6/104* (2013.01); *H05B 6/362* (2013.01); *C21D 1/42* (2013.01); *Y02P 10/253* (2015.11)

(56) References Cited

U.S. PATENT DOCUMENTS

| | | | |
|---|---|---|---|
| 3,444,346 | A | 5/1969 | Russell et al. |
| 4,317,188 | A | 2/1982 | Ushikoshi |
| 4,357,512 | A | 11/1982 | Nishimoto et al. |
| 4,678,883 | A | 7/1987 | Saitoh et al. |
| 4,708,325 | A | 11/1987 | Georges |
| 4,795,872 | A | 1/1989 | Hagisawa et al. |
| 4,824,536 | A | 4/1989 | Kim et al. |
| 5,034,586 | A | 7/1991 | Havas et al. |
| 5,055,647 | A | 10/1991 | Heyes et al. |
| 5,126,522 | A | 6/1992 | Katayama et al. |
| 5,157,233 | A | 10/1992 | Inokuma et al. |
| 5,378,879 | A | 1/1995 | Monovoukas |
| 5,397,877 | A | 3/1995 | Couffet et al. |
| 5,510,600 | A | 4/1996 | Jackson |
| 5,739,506 | A | 4/1998 | Hanton et al. |
| 5,770,838 | A | 6/1998 | Rohrbaugh et al. |
| 5,827,056 | A | 10/1998 | Rohrbaugh et al. |
| 5,911,094 | A | 6/1999 | Tsujimoto |
| 6,154,629 | A | 11/2000 | Kinouchi et al. |
| 6,262,402 | B1 | 7/2001 | Isoyama et al. |
| 6,498,328 | B2 | 12/2002 | Anderhuber et al. |
| 6,570,141 | B2 | 5/2003 | Ross |
| 6,576,877 | B2 | 6/2003 | Dabelstein et al. |
| 6,576,878 | B2 | 6/2003 | Thorpe et al. |
| 6,710,314 | B2 | 3/2004 | Reiss et al. |
| 6,849,837 | B2 | 2/2005 | Riess et al. |
| 6,930,293 | B2 | 8/2005 | Matsuo et al. |
| 6,930,891 | B1 | 8/2005 | Hama et al. |
| 6,969,833 | B2 | 11/2005 | Suzuki |
| 7,057,485 | B2 | 6/2006 | Preusse et al. |
| 7,183,526 | B2 | 2/2007 | Yoshino et al. |
| 7,525,073 | B2 | 4/2009 | Lovens et al. |
| 2003/0038130 | A1 | 2/2003 | Thomas et al. |
| 2003/0155349 | A1 | 8/2003 | Matsuo et al. |
| 2004/0050839 | A1* | 3/2004 | Riess ............... B23K 13/01 219/603 |
| 2005/0006120 | A1 | 1/2005 | Lovens |
| 2005/0061803 | A1 | 3/2005 | Sivasubramaniam et al. |
| 2005/0274717 | A1 | 12/2005 | Kataoka et al. |
| 2007/0194010 | A1* | 8/2007 | Lovens ............... C21D 1/42 219/645 |
| 2008/0203088 | A1 | 8/2008 | Kinouchi et al. |
| 2008/0296290 | A1 | 12/2008 | Cao et al. |
| 2009/0057301 | A1 | 3/2009 | Lovens |
| 2010/0014333 | A1* | 1/2010 | Shimada ............... H05B 6/04 363/126 |
| 2010/0258535 | A1 | 10/2010 | Fukutani et al. |
| 2012/0305547 | A1* | 12/2012 | Fukutani ............... C21D 9/60 219/660 |

FOREIGN PATENT DOCUMENTS

| | | |
|---|---|---|
| JP | 2001-6862 A | 1/2001 |
| JP | 2001-6863 A | 1/2001 |
| JP | 2002-313547 A | 10/2002 |
| JP | 2003-73746 A | 3/2003 |
| JP | 2004-114092 A | 4/2004 |
| JP | 2005-49815 A | 2/2005 |
| JP | 2006-244763 A | 9/2006 |
| JP | 2008-159505 A | 7/2008 |
| JP | 2008-159572 A | 7/2008 |
| JP | 2009-93805 A | 4/2009 |
| JP | 2009-289458 A | 12/2009 |
| RU | 2032996 C1 | 4/1995 |
| RU | 2150796 C1 | 6/2000 |
| RU | 2357383 C1 | 5/2009 |
| RU | 2372753 C2 | 5/2009 |
| WO | WO 2009/139079 A1 | 11/2009 |

OTHER PUBLICATIONS

International Search Report issued in PCT/JP2010/070800, dated Feb. 15, 2011.
Notice of Allowance dated Sep. 19, 2013 issued in Russian Patent Application No. 2012125958.
Office Action issued in Japanese Patent Application No. 2011-171344, dated Oct. 4, 2011.
Office Action issued in Japanese Patent Application No. 2011-512742, dated Aug. 30, 2011.
Microwave101_High Permeablility Materials (3 pages).
Notice of Allowance issued in U.S. Appl. No. 13/514,738 dated Sep. 15, 2015.
Office Action issued in U.S. Appl. No. 13/514,738 dated Jan. 15, 2015.
Office Action issued in U.S. Appl. No. 13/514,738 dated Mar. 19, 2015.
U.S. Office Action for counterpart U.S. Appl. No. 14/968,130, dated Jul. 5, 2017.

* cited by examiner

CONTROL UNIT OF INDUCTION HEATING UNIT, INDUCTION HEATING SYSTEM, AND METHOD OF CONTROLLING INDUCTION HEATING UNIT

CROSS REFERENCE TO RELATED APPLICATIONS

This application is a Divisional application of co-pending U.S. application Ser. No. 13/514,738 filed on Jun. 8, 2012, which is the National Phase of International Application No. PCT/JP2010/070800 filed on Nov. 22, 2010, which claims benefit of priority under 35 U.S.C. 119(a) to Japanese Patent Application No. 2009-283255 filed in Japan on Dec. 14, 2009, all of which are hereby expressly incorporated by reference into the present application.

FIELD OF THE INVENTION

The present invention relates to a control unit of an induction heating unit, an induction heating system, and a method of controlling the induction heating unit. Particularly, the present invention is suitable for being used to make an alternating magnetic field intersect a conductive sheet in a substantially orthogonal manner so as to inductively heat the conductive sheet.

DESCRIPTION OF RELATED ART

In the conventional techniques, for example, an induction heating unit has been used when heating a conductive sheet such as a steel sheet that is conveyed through a manufacturing line. The induction heating unit is provided with a heating coil, and heats the conductive sheet using an eddy current induced by the heating coil. In this induction heating unit, the eddy current is caused to the conductive sheet by an alternating magnetic field (AC magnetic field) generated by the heating coil, Joule heat is generated in the conductive sheet due to the eddy current. As an example of the induction heating unit, a transverse type induction heating unit is disclosed. In the transverse type induction heating unit, the alternating magnetic field is applied to the conductive sheet in a manner that intersects a sheet surface of the conductive sheet, which is an object to be heated, to be substantially orthogonal thereto.

As a method of controlling the transverse type induction heating unit, a technique disclosed in Patent Citation 1 may be exemplified. In Patent Citation 1, a capacitor is provided in parallel to the heating coil that makes up the induction heating unit, the heating coil and the capacitor make up a parallel resonance circuit, and power is supplied to the heating coil by a parallel resonance type inverter.

PATENT CITATION

[Patent Citation 1] Japanese Unexamined Patent Application, First Publication No. 2002-313547

SUMMARY OF THE INVENTION

Problems to be Solved by the Invention

However, when the heating coil of the induction heating unit is seen from a power supply unit (power supply circuit) of the induction heating unit, the inductance varies in response to the sheet conveyance speed of the conductive sheet that is an object to be heated by the induction heating unit (in the following description, this inductance is referred to as apparent inductance as necessary). Specifically, when the sheet conveyance speed of the conductive sheet becomes fast (or slow), the apparent inductance becomes small (or large).

However, in the technique disclosed in Patent Citation 1, the heating coil and the capacitor make up the parallel resonance circuit. Therefore, when the apparent inductance varies, the power frequency, which is supplied to the heating coil, also varies. For example, when the sheet conveyance speed of the conductive sheet becomes fast and thereby the apparent inductance becomes small, the frequency of the power supplied to the heating coil increases. In this manner, when the frequency of the power supplied to the heating coil increases, the temperature in the vicinity of an end portion (edge) of the conductive sheet in the sheet width direction becomes higher than that in the vicinity of the central portion of the conductive sheet in the sheet width direction. Therefore, there is a concern in that a temperature distribution of the conductive sheet in the sheet width direction may be non-uniform.

As described above, in the conventional techniques, in a case where the conductive sheet is heated by using the transverse type induction heating unit, there is a problem in that as the sheet conveyance speed of the conductive sheet varies, the temperature distribution of the conductive sheet in the sheet width direction becomes non-uniform.

The present invention has been made in consideration of this problem, and an object of the present invention is to realize a temperature distribution that is more uniform than that in the conventional techniques by preventing the temperature distribution of the conductive sheet in the sheet width direction from being non-uniform even when the sheet conveyance speed of the conductive sheet varies in a case where the conductive sheet is heated using a transverse type induction heating unit.

Methods for Solving the Problem (1) A control unit of an induction heating unit according to an aspect of the present invention controls AC power output to a heating coil of a transverse type induction heating unit allowing an alternating magnetic field to intersect a sheet surface of a conductive sheet that is being conveyed to inductively heat the conductive sheet. The control unit includes: a magnetic energy recovery switch that outputs AC power to the heating coil, a frequency setting unit that sets the output frequency in response to at least one of the relative permeability, resistivity, and sheet thickness of the conductive sheet; and a gate control unit that controls a switching operation of the magnetic energy recovery switch on the basis of the output frequency set by the frequency setting unit.

(2) In the control unit of an induction heating unit according to (1), the frequency setting unit may acquire attribute information that specifies the relative permeability, resistivity, and sheet thickness of the conductive sheet, and may select a frequency corresponding to the acquired attribute information as the output frequency with reference to a table in which the relative permeability, resistivity, and sheet thickness of the conductive sheet, and the frequency are correlated with each other and are registered in advance.

(3) The control unit of an induction heating unit according to (1) or (2) may further include: an output current setting unit that sets an output current value in response to at least one of the relative permeability, resistivity, and sheet thickness of the conductive sheet; a current measuring unit that measures an alternating current that flows to the induction heating unit; and a power supply unit that supplies DC power to the magnetic energy recovery switch and adjusts an alternating current that is measured by the current measuring unit to the output current value that is set by the output current setting unit, wherein the magnetic energy recovery switch may be supplied with the DC power by the power supply unit and may output the AC power to the heating coil.

(4) In the control unit of an induction heating unit according to (3), the output current setting unit may acquire attribute information that specifies the relative permeability, resistivity, and sheet thickness of the conductive sheet, and may select a current value corresponding to the acquired attribute information as the output current value with reference to a table in which the relative permeability, resistivity, and sheet thickness of the conductive sheet, and the current value are correlated with each other and are registered in advance.

(5) The control unit of an induction heating unit according to (1) or (2) may further include an output transformer that is disposed between the magnetic energy recovery switch and the induction heating unit, lowers the AC voltage that is output from the magnetic energy recovery switch, and outputs the lowered AC voltage to the heating coil.

(6) In the control unit of an induction heating unit according to (1) or (2), the magnetic energy recovery switch may include first and second AC terminals that are connected to one end and the other end of the heating coil, respectively, first and second DC terminals that are connected to an output terminal of the power supply unit, a first reverse conductivity type semiconductor switch that is connected between the first AC terminal and the first DC terminal, a second reverse conductivity type semiconductor switch that is connected between the first AC terminal and the second DC terminal, a third reverse conductivity type semiconductor switch that is connected between the second AC terminal and the second DC terminal, a fourth reverse conductivity type semiconductor switch that is connected between the second AC terminal and the first DC terminal, and a capacitor that is connected between the first and second DC terminals, the first reverse conductivity type semiconductor switch and the fourth reverse conductivity type semiconductor switch may be connected in series in such a manner that conduction directions at the time of a switch-off become opposite to each other, the second reverse conductivity type semiconductor switch and the third reverse conductivity type semiconductor switch may be connected in series in such a manner that conduction directions at the time of the switch-off become opposite to each other, the first reverse conductivity type semiconductor switch and the third reverse conductivity type semiconductor switch may have the same conduction direction at the time of the switch-off as each other, the second reverse conductivity type semiconductor switch and the fourth reverse conductivity type semiconductor switch may have the same conduction direction at the time of the switch-off as each other, and the gate control unit may control a switching operation time of the first and third reverse conductivity type semiconductor switches and a switching operation time of the second and fourth reverse conductivity type semiconductor switches on the basis of the output frequency that is set by the frequency setting unit.

(7) An induction heating system according to another aspect of the present invention allows an alternating magnetic field to intersect a sheet surface of a conductive sheet that is being conveyed to inductively heat the conductive sheet. The induction heating system includes: the control unit of an induction heating unit according to (1) or (2); a heating coil that is disposed to face the sheet surface of the conductive sheet; a core around which the heating coil is wound; and a shielding plate which is disposed to face a region including an edge of the conductive sheet in the width direction and is formed from a conductor having a relative permeability of 1.

(8) In the induction heating system according to (7), the shielding plate may have a depressed portion.

(9) In the induction heating system according to (8), the shielding plate may be disposed in such a manner that a region, which is closer to the edge of the conductive sheet than a region in which an eddy current flowing to the conductive sheet becomes the maximum, and the depressed portion face each other.

(10) A method of controlling an induction heating unit according to still another aspect of the present invention controls AC power, which is output to a heating coil of a transverse type induction heating unit allowing an alternating magnetic field to intersect a sheet surface of a conductive sheet that is being conveyed to inductively heat the conductive sheet. The method includes: outputting AC power to the heating coil by a magnetic energy recovery switch; setting an output frequency in response to at least one of a relative permeability, resistivity, and sheet thickness of the conductive sheet; and controlling a switching operation of the magnetic energy recovery switch on the basis of the output frequency that is set.

(11) In the method of controlling an induction heating unit according to (10), the output frequency may be set by acquiring attribute information that specifies the relative permeability, resistivity, and sheet thickness of the conductive sheet, and by selecting a frequency corresponding to the acquired attribute information as the output frequency with reference to a table in which the relative permeability, resistivity, and sheet thickness of the conductive sheet, and the frequency are correlated with each other and are registered in advance.

(12) The method of controlling an induction heating unit according to (10) or (11) may further include: setting an output current value in response to at least one of the relative permeability, resistivity, and sheet thickness of the conductive sheet; measuring an alternating current that flows to the induction heating unit; and supplying DC power, which is necessary for adjusting an alternating current that is measured to the output current value that is set, to the magnetic energy recovery switch.

(13) In the method of controlling an induction heating unit according to (12), the output current value may be set by acquiring attribute information that specifies the relative permeability, resistivity, and sheet thickness of the conductive sheet, and by selecting a current value corresponding to the acquired attribute information as the output current value with reference to a table in which the relative permeability, resistivity, and sheet thickness of the conductive sheet, and the current value are correlated with each other and are registered in advance.

(14) In the method of controlling an induction heating unit according to (10) or (11), an AC voltage that is output from the magnetic energy recovery switch may be lowered by an output transformer, and the lowered AC voltage may be output to the heating coil.

(15) In the method of controlling an induction heating unit according to (10) or (11), the magnetic energy recovery switch may include first and second AC terminals that are connected to one end and the other end of the heating coil, respectively, first and second DC terminals that are connected to an output terminal of the power supply unit, a first reverse conductivity type semiconductor switch that is connected between the first AC terminal and the first DC terminal, a second reverse conductivity type semiconductor switch that is connected between the first AC terminal and the second DC terminal, a third reverse conductivity type semiconductor switch that is connected between the second AC terminal and the second DC terminal, a fourth reverse conductivity type semiconductor switch that is connected between the second AC terminal and the first DC terminal, and a capacitor that is connected between the first and second DC terminals, the first reverse conductivity type semiconductor switch and the fourth reverse conductivity type semiconductor switch may be connected in series in such a manner that conduction directions at the time of a switch-off become opposite to each other, the second reverse conductivity type semiconductor switch and the third reverse conductivity type semiconductor switch may be connected in series in such a manner that conduction directions at the time of the switch-off become opposite to each other, the first reverse conductivity type semiconductor switch and the third reverse conductivity type semiconductor switch may have the same conduction direction at the time of the switch-off as each other, the second reverse conductivity type semiconductor switch and the fourth reverse conductivity type semiconductor switch may have the same conduction direction at the time of the switch-off as each other, and the AC power may be output to the heating coil by controlling a switching operation time of the first and third reverse conductivity type semiconductor switches and a switching operation time of the second and fourth reverse conductivity type semiconductor switches on the basis of the output frequency that is set.

Effects of the Invention

According to the control unit of an induction heating unit according to the aspect of the present invention, the switching operation of the magnetic energy recovery switch is controlled on the basis of the frequency in response to at least one of the relative permeability, resistivity, and sheet thickness of the conductive sheet that is being conveyed, and the AC power of this frequency is output from the magnetic energy recovery switch. Therefore, the AC power of the frequency corresponding to the attribute of the conductive sheet that is being conveyed can be applied to the heating coil without being subjected to a restriction in regard to an operation with a resonant frequency. Therefore, it is possible to prevent the temperature distribution of the conductive sheet in the sheet width direction from being non-uniform even when a sheet conveyance speed of the conductive sheet varies in a case where the conductive sheet is heated using a transverse type induction heating unit. In addition, the AC power with the frequency in response to the attribute of the conductive sheet that is being conveyed can be supplied to the heating coil independently from operational conditions, such that the induction heating control can be performed in a relatively simple and reliable manner.

DETAILED DESCRIPTION OF THE INVENTION

Hereinafter, embodiments of the present invention will be described with reference to the attached drawings. In each of the following embodiments, a description will be made with respect to an example in which a transverse type induction heating unit and a control unit thereof are applied to a continuous annealing line of a steel sheet in a manufacturing line. In addition, in the following description, "transverse type induction heating unit" will be simply referred to as "induction heating unit" as necessary. In addition, unless particularly specified, in regard to attributes of the steel sheet (steel strip), values at room temperature (for example, 25° C.) will be used.

First Embodiment

First, a first embodiment of the present invention will be described.

<Schematic Configuration of Continuous Annealing Line>

Figure 1:
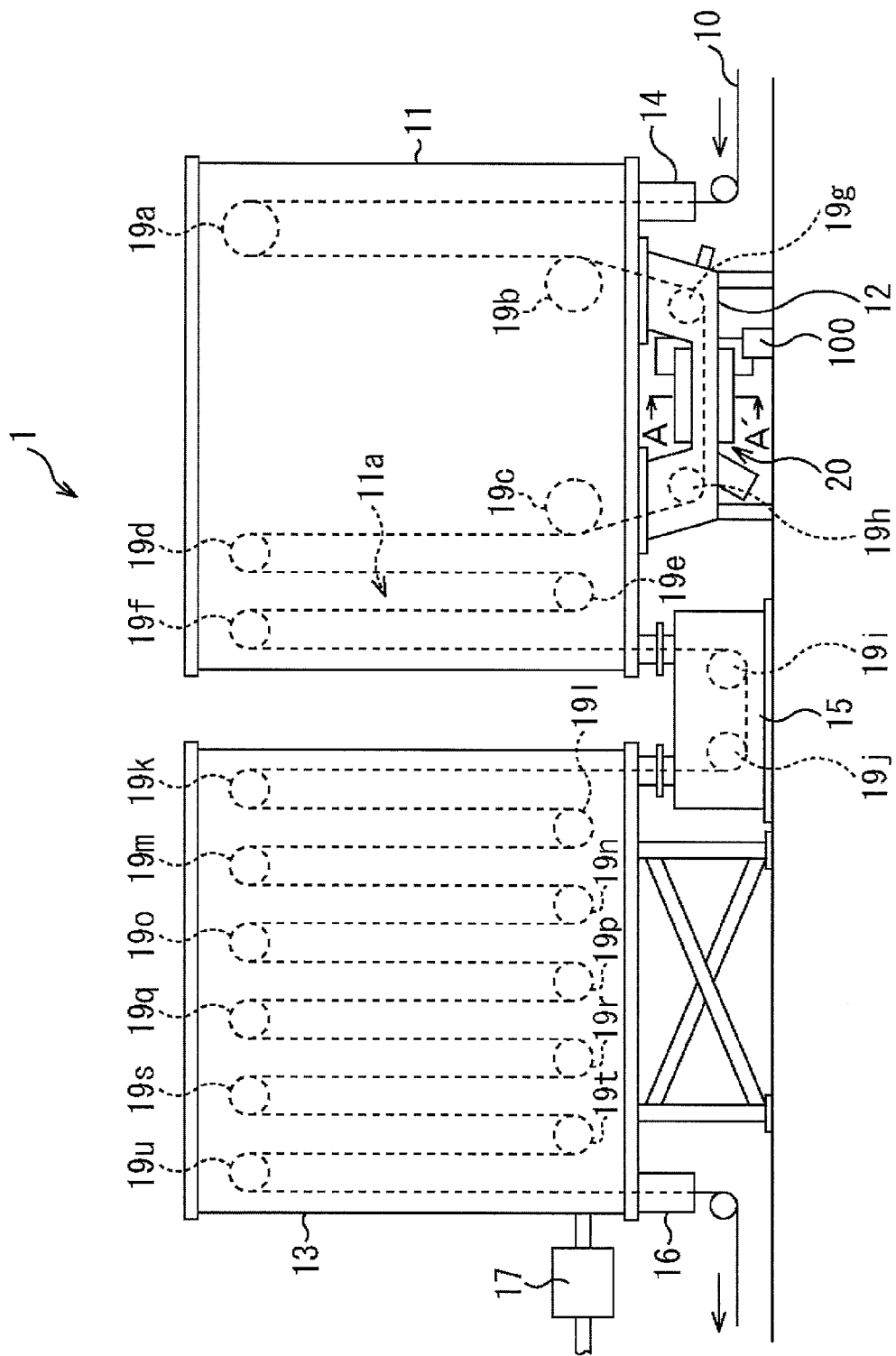
FIG. 1 is a side view illustrating an example of a schematic configuration of a continuous annealing line of a steel sheet according to a first embodiment of the present invention.

FIG. 1 shows a side view illustrating an example of schematic configuration of a continuous annealing line of a steel sheet.

In FIG. 1, the continuous annealing line 1 includes a first container 11, a second container 12, a third container 13, a first sealing roller assembly 14, a conveyance unit 15, a second sealing roller assembly 16, a gas supply unit 17, rollers 19a to 19u, an induction heating unit 20, and a control unit 100 of the induction heating unit. In addition, the induction heating unit 20 and the control unit 100 of the induction heating unit make up an induction heating system.

The first sealing roller assembly 14 conveys (feeds) a steel strip 10 into the first container 11 while shielding the first container 11 from external air. The steel strip 10 conveyed into the first container 11 by the first sealing roller assembly 14 is conveyed into the second container 12 by the rollers 19a and 19b in the first container 11. The steel strip 10 conveyed into the second container 12 is again conveyed into the first container 11 by the rollers 19g and 19h while being heated by the induction heating unit 20 which is disposed at both an upper side and a lower side of a horizontal portion of the second container 12 (of the steel strip 10 that is being conveyed). Here, the induction heating unit 20 (heating coil thereof) is electrically connected to the control unit 100 of the induction heating units, and AC power is supplied to the induction heating unit 20 from the control unit 100 of the induction heating unit. An alternating magnetic field, which intersects a sheet surface of the steel strip 10 in a substantially orthogonal manner, is generated by the AC power, and thereby the steel strip 10 is inductively heated. In addition, details of a configuration of the induction heating unit 20 will be described later. In addition, in the following description, "electrical connection" will be simply referred to as "connection" as necessary.

The steel strip 10 that is returned into the first container 11 is conveyed to the conveyance unit 15 by the rollers 19c to 19f after passing through a soaking and slow cooling stage. The steel strip 10 conveyed to the conveyance unit 15 is conveyed to the third container 13 by the rollers 19i and 19j. The steel strip 10 conveyed to the third container 13 is conveyed while being made to move in a vertically up and down manner by the rollers 19k to 19u and is rapidly cooled in the third container 13.

The second sealing roller assembly 16 forwards the steel strip 10, which is rapidly cooled in this manner, to a subsequent process while shielding the third container 13 from external air.

To the "first container 11, the second container 12, the third container 13, and the conveyance unit 15" that make up a "conveying path of the steel strip 10" described above, non-oxidation gas is supplied by the gas supply unit 17. In addition, the first container 11, the second container 12, the third container 13, and the conveyance unit 15 are maintained in a non-oxidation gas atmosphere by the "first sealing roller assembly 14 and the second sealing roller assembly 16" that shield the outside (external air) and the inside (the inside of the continuous annealing line 1).

<Configuration of Induction Heating Unit 20>

Figure 2A:
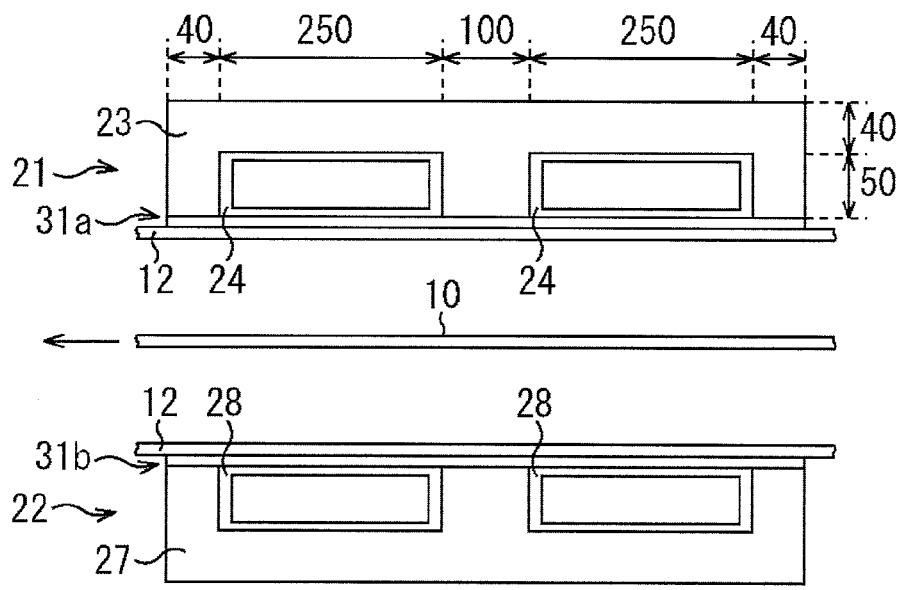
FIG. 2A is a longitudinal cross-sectional view illustrating an example of a configuration of an induction heating unit according to the first embodiment of the present invention.
Figure 2B:
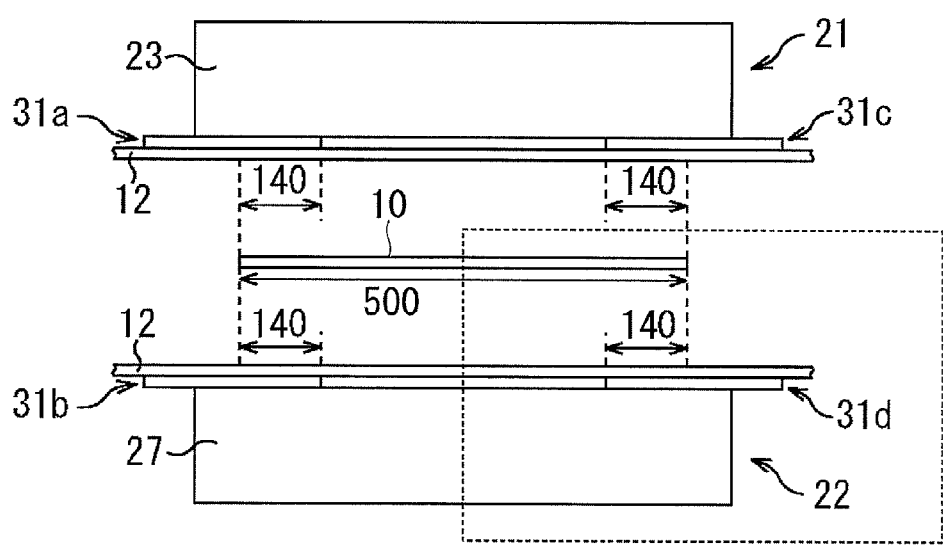
FIG. 2B is a longitudinal cross-sectional view illustrating an example of the configuration of the induction heating unit according to the first embodiment of the present invention.
Figure 2C:
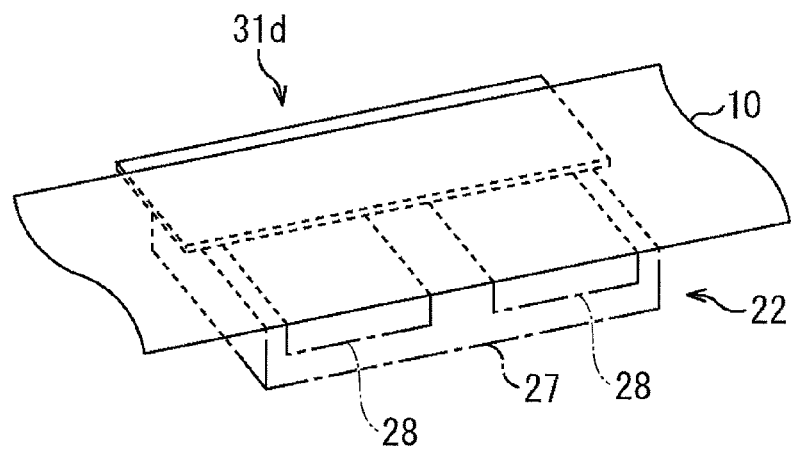
FIG. 2C is a partial perspective view illustrating an example of the configuration of the induction heating unit according to the first embodiment of the present invention.

FIGS. 2A to 2C show views illustrating an example of a configuration of an induction heating unit.

Specifically, FIG. 2A shows a view illustrating an example of the induction heating unit 20 according to this embodiment, which is seen from a lateral direction of a line, and is a longitudinal cross-sectional view that is cut along the longitudinal direction (the vertical direction in FIG. 1) of the steel strip 10. In FIG. 2A, the steel strip 10 is conveyed toward the left direction (refer to an arrow facing from the right side to the left side in FIG. 2A). In addition, FIG. 2B shows a longitudinal cross-sectional view illustrating an example of the induction heating unit 20 according to this embodiment, which is seen from an A-A' direction in FIG. 1 (that is a view seen from a downstream in the sheet conveyance direction). In FIG. 2B, the steel strip 10 is conveyed from the depth direction to the front direction. In addition, in FIGS. 2A and 2B, dimensions [mm] are also illustrated. In addition, FIG. 2C shows a partial perspective view illustrating a part of an example of the induction heating unit 20 according to this embodiment. In FIG. 2C, a lower-right region shown in FIG. 2B (region surrounded by a broken line in FIG. 2B) is overlooked from an upper side of the steel strip 10. However, in FIG. 2C, the second container 12 is omitted for easy understanding of the positional relationship between a shielding plate 31 and the steel strip 10.

In FIGS. 2A to 2C, the induction heating unit 20 includes an upper side inductor 21 and a lower side inductor 22.

The upper side inductor 21 includes a core (magnetic core) 23, an upper side heating coil 24, and shielding plates 31a and 31c. The core 23 may be configured by stacking a plurality of electrical steel sheets.

The upper side heating coil 24 is a conductor that is wound on the core 23 through a slot (here, a depressed portion of the core 23) of the core 23, and is a coil in which the number of turns is "1" (so-called single turn). In addition, as shown in FIG. 2A, the upper side heating coil 24 has a portion in which the shape of the longitudinal cross-section thereof is a hollow rectangle. A water-cooling pipe is connected to an end face of the hollow portion of the hollow rectangle. Cooling water supplied from the water-cooling pipe flows to the hollow portion of the hollow rectangle (the inside of the upper side heating coil 24) and thereby the upper side inductor 21 is cooled. In addition, the shielding plates 31a and 31c are attached on the bottom surface (slot side) of the core 23.

Similarly to the upper side inductor 21, the lower side inductor 22 is also provided with a core (magnetic core) 27, a lower side heating coil 28, and shielding plates 31b and 31d.

Similarly to the upper side heating coil 24, the lower side heating coil 28 is a conductor that passes through a slot of the core 27 and is wound on the core 27, and is a coil in which the number of turns is "1" (so-called single turn). Furthermore, similarly to the upper side heating coil 24, the lower side heating coil 28 has a portion in which a shape of a longitudinal cross-section thereof is a hollow rectangle. A water-cooling pipe is connected to an end face of the hollow portion of the hollow rectangle, and cooling water can be made to flow to the hollow portion of the hollow rectangle. In addition, the shielding plates 31b and 31d are installed on the upper surface (slot side) of the core 27.

In addition, a coil face (face on which a loop is formed and through which a line of magnetic force penetrates) of the upper side heating coil 24 of the upper side inductor 21, and a coil face of the lower side heating coil 28 of the lower side inductor 22 face each other with the steel strip 10 interposed therebetween. Furthermore, sheet surfaces of the shielding plates 31a to 31d face end portions (edges) of the steel strip 10 in the sheet width direction. To satisfy this positional relationship, the upper side inductor 21 is provided at an upper side (in the vicinity of the upper surface of a horizontal portion of the second container 12) compared to the steel strip 10, and the lower side inductor 22 is provided at a lower side (in the vicinity of the lower surface of the horizontal portion of the second container 12) compared to the steel strip 10. In this embodiment, the shielding plates 31a to 31d are copper plates that have a flat surface (refer to FIG. 2C). The shielding plates 31a to 31d weaken the degree of electromagnetic coupling between the upper side heating coil 24 and the steel strip 10, and the degree of electromagnetic coupling between the lower side heating coil 28 and the steel strip 10, thereby preventing the vicinity of the edges of the steel strip 10 in the steel width direction from being overheated.

In this manner, the upper side inductor 21 and the lower side inductor 22 are different from each other in the position to be disposed, but have the same configuration as each other. In addition, in this configuration, since an alternating magnetic field generated from the heating coils intersects the conductive sheet 10 over the entire width thereof, the entire width of the conductive sheet 10 may be heated.

Figure 3:
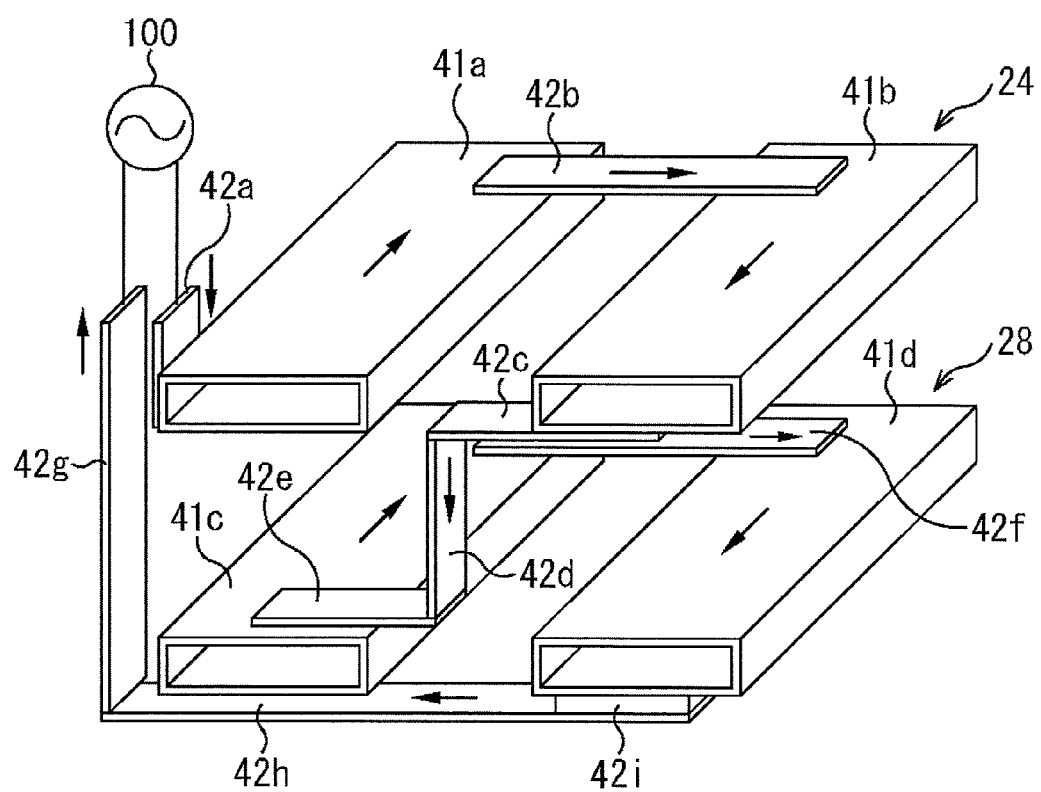
FIG. 3 is a view illustrating an example of a configuration of an upper side heating coil and a lower side heating coil according to the first embodiment of the present invention.

FIG. 3 shows a view illustrating an example of a configuration of the upper side heating coil 24 and the lower side heating coil 28. In addition, arrows shown in FIG. 3 illustrate an example of a direction in which a current flows.

As shown in FIG. 3, the upper side heating coil 24 includes copper pipes 41a and 41b, and a copper bus bar (connection plate) 42b that is connected to base-end sides of the copper pipes 41a and 41b. In addition, the lower side heating coil 28 includes copper pipes 41c and 41d, and a copper bus bar 42f that is connected to base-end sides of the copper pipes 41c and 41d.

One output terminal of the control unit 100 of the induction heating unit is connected to one end (front-end side of the copper pipe 41a) of the upper side heating coil 24 through the copper bus bar 42a. On the other hand, one end (front-end side of the copper pipe 41c) of the lower side heating coil 28 is connected to the other end (front-end side of the copper pipe 41b) of the upper side heating coil 24 through the copper bus bars 42c to 42e. In addition, the other output terminal of the control unit 100 of the induction heating unit is connected to the other end (front-end side of the copper pipe 41d) of the lower side heating coil 28 through copper bus bars 42i, 42h, and 42g.

As described above, the upper side heating coil 24 and the lower side heating coil 28 are connected in series to the control unit 100 of the induction heating unit by combining the copper pipes 41a to 41d and the copper bus bars 42a to 42i, thereby forming coils in which the number of turns is "1". Here, the direction (in FIG. 3, a clockwise rotation) of a loop of a current that flows through the upper side heating coil 24 is the same as the direction of a loop of a current that flows through the lower side heating coil 28.

In addition, as described later, the control unit 100 of the induction heating unit supplies AC power to the upper side heating coil 24 and the lower side heating coil 28 of the induction heating unit 20. Therefore, in FIG. 3, the control unit 100 of the induction heating unit is indicated as an AC power supply.

In addition, here, for illustrating a configuration of the upper side heating coil 24 and the lower side heating coil 28 in an easy manner, the copper pipes 41a to 41d and the copper bus bars 42a to 42i are connected in a manner as shown in FIG. 3. However, to wind the upper side heating coil 24 and the lower side heating coil 28 on the cores 23 and 27, respectively, it is necessary for the copper pipes 41a to 41d to pass through (to be attached to) the slots of the cores 23 and 27. Therefore, actually, the copper bus bars 42a to 42g are installed to the copper pipes 41a to 41d at portions other than portions in which the copper pipes 41a to 41d are installed to the cores 23 and 27.

<Configuration of Control Unit 100 of Induction Heating Unit>

Figure 4:
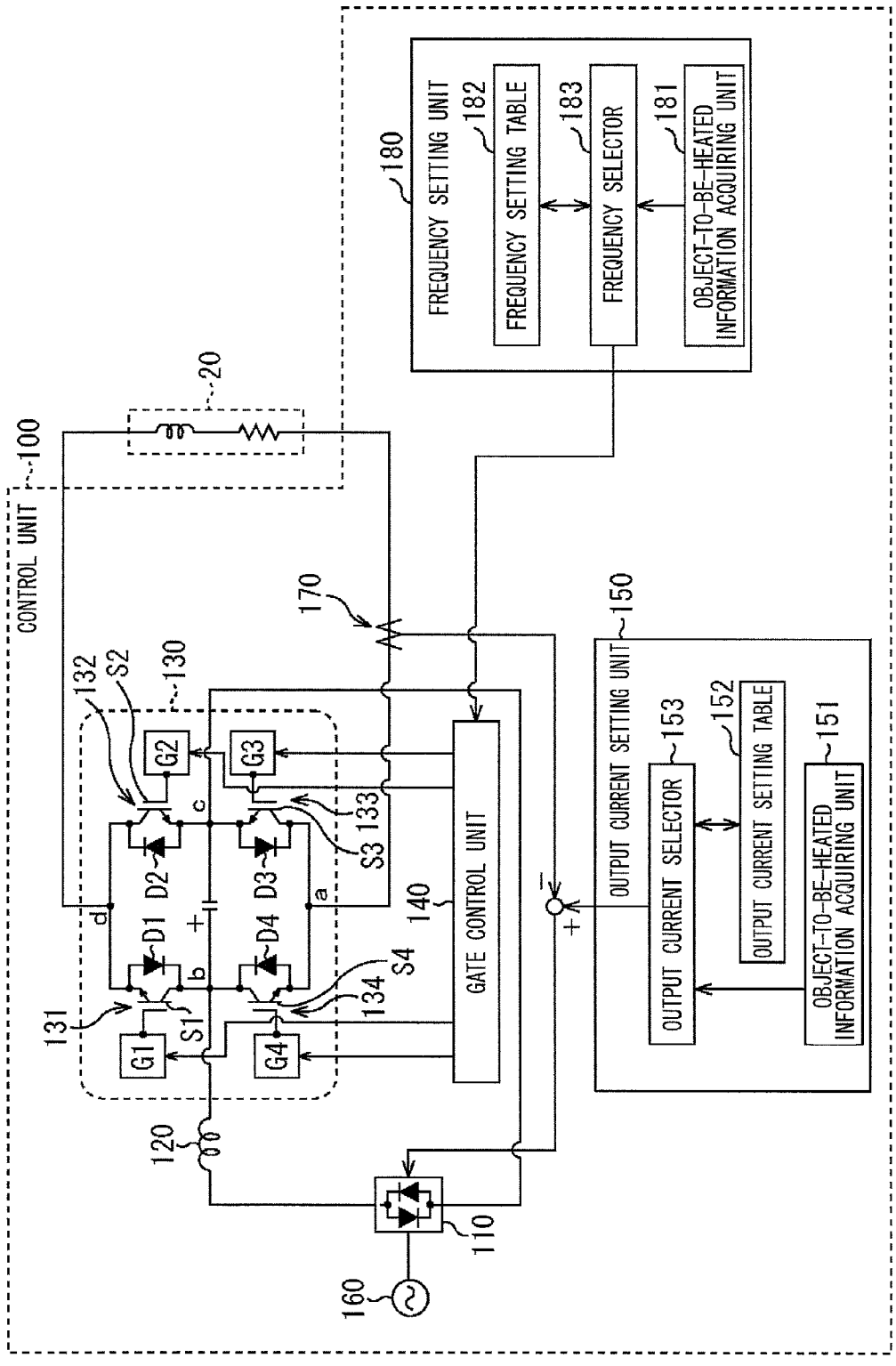
FIG. 4 is a view illustrating an example of a configuration of a control unit of the induction heating unit according to the first embodiment of the present invention.

FIG. 4 shows a view illustrating an example of a configuration of the control unit 100 of the induction heating unit. In addition, in the following description, "control unit of the induction heating unit" is simply referred to as "control unit" as necessary.

In FIG. 4, the control unit 100 includes an AC power supply 160, a rectifying unit 110, a reactor 120, a magnetic energy recovery bidirectional current switch (MERS; Magnetic Energy Recovery Switch) 130, a gate control unit 140, an output current setting unit 150, a current transformer 170, and a frequency setting unit 180. Here, the current transformer 170 is used as a current measuring unit that measures the value of an alternating current that flows to the induction heating unit. In addition, in the following description, "magnetic energy recovery switch" is referred to as "MERS" as necessary.

In FIG. 4, the AC power supply 160 is connected to an input terminal of the rectifying circuit 110. One end of the reactor 120 is connected to one end of the rectifying circuit 110 on an output side, and a DC terminal c of the MERS 130 is connected to the other end of the rectifying circuit 110. The other end of the reactor 120 is connected to a DC terminal b of the MERS 130. The rectifying circuit 110 rectifies AC power supplied from the AC power supply 160 and applies DC power to the MERS 130 through the reactor 120. The rectifying circuit 110 is configured by using, for example, a thyristor. As described above, in this embodiment, for example, a power supply unit is realized using the AC power supply 160 and the rectifying circuit 110. This power supply unit is a unit that supplies DC power described later to the DC terminals b and c of the MERS 130 in FIG. 4. Therefore, a DC power supply such as a battery that has a current control function may be used as the power supply unit.

[Configuration of MERS 130]

Hereinafter, an example of a configuration of the MERS 130 will be described.

The MERS 130 converts DC power, which is input from the rectifying circuit 110 through the reactor 120, to AC power according to a method described later, and outputs the AC power to the induction heating unit 20.

In FIG. 4, the MERS 130 includes a bridge circuit that is configured using first to fourth reverse conductivity type semiconductor switches 131 to 134, and a capacitor C having a polarity. This capacitor C is connected between DC terminals b and c of the bridge circuit, and a positive electrode (+) of the capacitor C is connected to the DC terminal b.

The other end of the reactor 120 is connected to the DC terminal b, and the other end of the rectifying circuit 110 on the output side is connected to the DC terminal c. In addition, one end (copper bus bar 42a) and the other end (copper bus bar 42g) of the induction heating unit 20 are connected to the AC terminals a and d (refer to FIG. 3), respectively.

The bridge circuit of the MERS 130 includes a first path L1 reaching the AC terminal d from the AC terminal a through the DC terminal b, and a second path L2 reaching the AC terminal d from the AC terminal a through the DC terminal c. The first reverse conductivity type semiconductor switch 131 is connected between the AC terminal d and the DC terminal b, and the fourth reverse conductivity type semiconductor switch 134 is connected between the DC terminal b and the AC terminal a. In addition, the second reverse conductivity type semiconductor switch 132 is connected between the AC terminal d and the DC terminal c, and the third reverse conductivity type semiconductor switch 133 is connected between the DC terminal c and the AC terminal a. In this manner, the first and second reverse conductivity type semiconductor switches 131 and 132 are connected in parallel, and the third and fourth reverse conductivity type semiconductor switches 133 and 134 are connected in parallel. In addition, the first and fourth reverse conductivity type semiconductor switches 131 and 134 are connected in series, and the second and third reverse conductivity type semiconductor switches 132 and 133 are connected in series.

Each of the first to fourth reverse conductivity type semiconductor switches 131 to 134 allows a current to flow in one direction at the time of a switch-off in which an on-signal is not input to a gate terminal thereof, and allows a current to flow in both directions at the time of a switch-on in which the on-signal is input to the gate terminal. That is, the reverse conductivity type semiconductor switches 131 to 134 allows a current to flow only in one direction between a source terminal and a drain terminal at the time of the switch-off, but allows a current to flow in both directions between the source terminal and the drain terminal at the time of the switch-on. In addition, in the following description, "a direction toward which each of the reverse conductivity type semiconductor switches 131 to 134 allows a current to flow at the time of the switch-off" is also referred to as "a switch forward direction" as necessary. In addition, "a direction toward which each of the reverse conductivity type semiconductor switches 131 to 134 does not allow a current to flow at the time of the switch-off" is also referred to as "a switch reverse direction" as necessary. Furthermore, in the following description, "a connection direction with respect to the bridge circuit in the switch forward direction and the switch reverse direction" is also referred to as "a switch polarity" as necessary.

In addition, each of the reverse conductivity type semiconductor switches 131 to 134 is disposed to satisfy the switch polarity as described below. The first reverse conductivity type semiconductor switch 131 and the second reverse conductivity type semiconductor switch 132, which are connected in parallel, have switch polarities opposite to each other. Similarly, the third reverse conductivity type semiconductor switch 133 and the fourth reverse conductivity type semiconductor switch 134, which are connected in parallel, have switch polarities opposite to each other. In addition, the first reverse conductivity type semiconductor switch 131 and the fourth reverse conductivity type semiconductor switch 134, which are connected in series, have switch polarities opposite to each other. Similarly, the second reverse conductivity type semiconductor switch 132 and the third reverse conductivity type semiconductor switch 133, which are connected in series, have switch polarities opposite to each other. Therefore, the first reverse conductivity type semiconductor switch 131 and the third reverse conductivity type semiconductor switch 133 have the same switch polarity as each other. Similarly, the second reverse conductivity type semiconductor switch 132 and the fourth reverse conductivity type semiconductor switch 134 have the same switch polarity as each other. In addition, the switch polarity of the first and third reverse conductivity type semiconductor switches 131 and 133 is opposite to that of the second and fourth reverse conductivity type semiconductor switches 132 and 134.

In addition, in regard to the switch polarities shown in FIG. 4, the switch polarity of the first and third reverse conductivity type semiconductor switches 131 and 133, and the switch polarity of the second and fourth reverse conductivity type semiconductor switches 132 and 134 may be reversed to each other.

In addition, various configurations may be considered with respect to the first to fourth reverse conductivity type semiconductor switches 131 to 134, but in this embodiment, the first to fourth reverse conductivity type semiconductor switches 131 to 134 are configured by a parallel connection between semiconductor switches S1 to S4 and diodes D1 to D4, respectively. That is, each of the first to fourth reverse conductivity type semiconductor switches 131 to 134 includes one diode (corresponding one among diodes D1 to D4) and one semiconductor switch (corresponding one among semiconductor switches S1 to S4) that is connected to the diode in parallel.

In addition, respective gate terminals G1 to G4 of the semiconductor switches S1 to S4 are connected to the gate control unit 140. An on-signal, which allows the semiconductor switches S1 to S4 to be turned on, is input to the gate terminals G1 to G4 from the gate control unit 140 as a control signal to the MERS 130. In a case where the on-signal is input, the semiconductor switches S1 to S4 enter an on-state, and may allow a current to flow in a both direction. However, in a case where the on-signal is not input, the semiconductor switches S1 to S4 enter an off-state, and can not allow a current to flow in any direction. Therefore, when the semiconductor switches S1 to S4 are turned off, a current can flow only in the conduction direction (forward direction) of the diodes D1 to D4 that are connected in parallel to the semiconductor switches S1 to S4.

In addition, the reverse conductivity type semiconductor switches included in the MERS 130 are not limited to the first to fourth reverse conductivity type semiconductor switches 131 to 134. That is, any reverse conductivity type semiconductor switch is preferable as long as this switch has a configuration capable of showing the above-described operation. For example, the reverse conductivity type semiconductor switches may have a configuration using a switching element such as a power MOSFET and a reverse conducting GTO thyristor, or may have a configuration in which a semiconductor switch such as an IGBT and a diode are connected in parallel.

In addition, hereinafter, a description will be made by substituting the switch polarity of the first to fourth reverse conductivity type semiconductor switches 131 to 134 with the polarity of the diodes D1 to D4. A switch forward direction (direction toward which a current flows at the time of a switch-off) is a conduction direction (forward direction) of each of the diodes D1 to D4, and a switch reverse direction (direction toward which a current does not flow at the time of the switch-off) is a non-conduction direction (reverse direction) of each of the diodes D1 to D4. In addition, conduction directions between diodes (D1 and D2, or D3 and D4) connected in parallel are opposite to each other, and conduction direction between diode (D1 and D4, or D2 and D3) connected in series are opposite to each other. In addition, conduction directions of the diodes D1 and D3 are the same as each other. Similarly, conduction directions of the diodes D2 and D4 are the same as each other. Therefore, the conduction direction of the diode D1 and D3 and the conduction direction of the diodes D2 and D4 are opposite to each other. In addition, the conduction directions of the semiconductor switches S1 to S4 and the diodes D1 to D4 are set with a direction of a current flowing to the induction heating unit 20 made as a reference.

[Operation of MERS 130]

Figure 5:
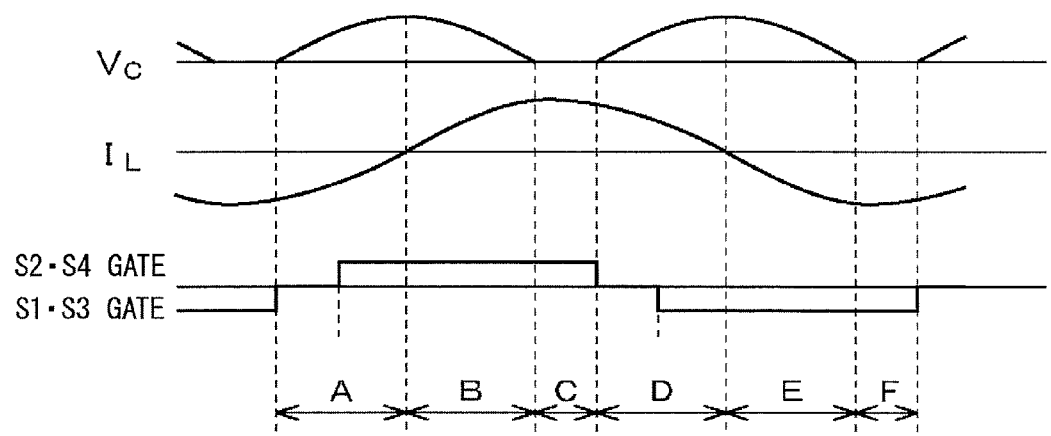
FIG. 5 is a view illustrating an example of a relationship between a voltage $V_c$ at both ends of a capacitor of an MERS, a current $I_L$ that flows to the induction heating unit, and an operation state of a semiconductor switch according to the first embodiment of the present invention.

FIG. 5 shows a view illustrating an example of a relationship between a voltage $V_c$ at both ends of a capacitor C of the MERS 130, a current $I_L$ that flows to the induction heating unit 20, and an operation state of the semiconductor switches S1 to S4.

In FIG. 5, for a period in which a waveform rises on a side indicated as "S1•S3 gate", the switches S1 and S3 are in an on-state, and the semiconductor switches S2 and S4 are in an off-state. In addition, for a period in which a waveform rises on a side indicated as "S2•S4 gate", the semiconductor switches S2 and S4 are in an on-state, and the switches S1 and S3 are in an off-state. For a period in which a waveform does not rise on either the "S1•S3 gate" side or the "S2•S4 gate" side, all of the semiconductor switches S1 to S4 are in an off-state. In this manner, when the semiconductor switch S1 is turned on (off), the semiconductor switch S3 is turned on (off), and therefore the semiconductor switches S1 and S3 operate in conjunction with each other. Similarly, when the semiconductor switch S2 is turned on (off), the semiconductor switch S4 is turned on (off), and therefore the semiconductor switches S2 and S4 operate in conjunction with each other. Hereinafter, an example of the operation of the MFRS 130 will be described with reference to FIGS. 4 and 5.

As shown in FIG. 5, an initial stage of a period A is a dead time accompanying a switch operation, and for this dead time, not only the semiconductor switches S1 and S3 but also the semiconductor switches S2 and S4 are turned off. For this dead time, a current flows through the path of the diode D4→the capacitor C→the diode D2, and therefore charging of the capacitor C is initiated. As a result, the voltage $V_c$ at both ends of the capacitor C is raised, and therefore the current $I_L$ (absolute value thereof) flowing to the induction heating unit 20 decreases. When the semiconductor switches S2 and S4 are turned on (while the semiconductor switches S1 and S3 are turned off) before the charging of the capacitor C is completed, a current flows through a path of the semiconductor switch S4 and the diode D4→the capacitor C→the semiconductor switch S2 and the diode D2, and therefore the capacitor C is charged (period A). That is, in this period A, the voltage $V_c$ at both ends of the capacitor C is raised, and therefore the current $I_L$ (absolute value thereof) flowing to the induction heating unit 20 decreases.

When the charging of the capacitor C is completed, the current $I_L$ flowing to the induction heating unit 20 becomes zero. When the semiconductor switches S2 and S4 are turned on until the charging of the capacitor C is completed, and then the charging of the capacitor C is completed, the energy (charge) charged in the capacitor C is output (discharged) through the semiconductor switches S4 and S2. As a result, the current $I_L$ flows through a path of the semiconductor switch S4→the induction heating unit 20→the semiconductor switch S2 (period B). That is, in this period B, the voltage $V_c$ at both ends of the capacitor C is lowered, and therefore the current $I_L$ (absolute value thereof) flowing to the induction heating unit 20 increases.

When the discharging of the capacitor C is completed, the voltage $V_c$ at both ends of the capacitor C becomes zero, and therefore a reverse voltage is not applied to the diodes D1 and D3. Therefore, the diodes D1 and D3 enter a conduction state, and the current $I_L$ flows through a path of the semiconductor switch S4→the induction heating unit 20→the diode D1 and a path of the diode D3→the induction heating unit 20→the semiconductor switch S2 in parallel (period C). The current $I_L$ circulates between the induction heating unit 20 and the MERS 130. Therefore, in the period C, the absolute value of the current $I_L$ is attenuated in response to a time constant that is determined by impedance of the upper side heating coil 24, the lower side heating coil 28, and the steel strip 10 that is an object to be heated.

Then, in the dead time, not only the semiconductor switches S1 and S3, but also the semiconductor switches S2 and S4 are turned off. For the dead time, a current flows through a path of the diode D1→the capacitor C→the diode D3, and therefore the charging of the capacitor C is initiated (period D). As a result, the voltage $V_c$ at both ends of the capacitor C is raised, and therefore the current $I_L$ (absolute value thereof) flowing to the induction heating unit 20 decreases. When the semiconductor switches S1 and S3 are turned on (while the semiconductor switches S2 and S4 are turned off) before the charging of the capacitor C is completed, a current flows through the path of the semiconductor switch S1 and the diode D1→the capacitor C→the semiconductor switch S3 and the diode D3, and therefore the capacitor C is charged (period D). That is, in this period D, the voltage $V_c$ at both ends of the capacitor C is raised, and therefore the current $I_L$ (absolute value thereof) flowing to the induction heating unit 20 decreases.

When the charging of the capacitor C is completed, the current $I_L$ flowing to the induction heating unit 20 becomes zero. When the semiconductor switches S1 and S3 are turned on until the charging of the capacitor C is completed, and then the charging of the capacitor C is completed, the energy (charge) charged in the capacitor C is output (discharged) through the semiconductor switches S1 and S3. As a result, the current $I_L$ flows through a path of the semiconductor switch S1→the induction heating unit 20→the semiconductor switch S3 (period E). That is, in this period E, the voltage $V_c$ at both ends of the capacitor C is lowered, and therefore the current $I_L$ (absolute value thereof) flowing to the induction heating unit 20 increases.

When the discharging of the capacitor C is completed, the voltage $V_c$ at both ends of the capacitor C becomes zero, and therefore a reverse voltage is not applied to the diodes D2 and D4. Therefore, the diodes D2 and D4 enter a conduction state, and the current $I_L$ flows through a path of the semiconductor switch S1→the induction heating unit 20→the diode D4 and a path of the diode D2→the induction heating unit 20→the semiconductor switch S3 in parallel (period F). The current $I_L$ circulates between the induction heating unit 20 and the MERS 130. Therefore, in the period F, the absolute value of the current $I_L$ is attenuated in response to a time constant that is determined by impedance of the upper side heating coil 24, the lower side heating coil 28, and the steel strip 10 that is an object to be heated. Then, it returns to the operation for the period A, and the operations for the periods A to F are repetitively performed.

As described above, when turn-on and turn-off (switching operation) timings (times) of the respective gate terminals G1 to G4 (G1 and G3, and G2 and G4) of the semiconductor switches S1 to S4 (S1 and S3, and S2 and S4) are adjusted, a current of a desired frequency can be made to flow through the induction heating unit 20 (the upper side heating coil 24 and the lower side heating coil 28), thereby realizing frequency control type induction heating. That is, due to the gate control unit 140 that adjusts the conduction timing of the semiconductor switches S1 to S4, a frequency of the current $I_L$ that flows to the induction heating unit 20 that is a load can be controlled to an arbitrary value. In addition, when capacitance $C_p$ of the capacitor C is determined according to Equation (1) described below, the period in which the voltage $V_c$ at both ends of the capacitor C is zero can be adjusted.

$$C_p = 1/[(2 \times \pi \times f_t)^2 \times L] \quad (1)$$

Here, $C_p$ represents capacitance (F) of the capacitor C, and L represents inductance (H) of loads including the induction heating unit 20. In addition, $f_t$ represents an apparent frequency (Hz) with respect to the capacitor C, which is expressed by Equation (2) described below.

$$f_t = 1/(2 \times t + 1/f) \quad (2)$$

Here, t represents a period (sec) in which the voltage $V_c$ at both ends of the capacitor C is zero, and f represents a frequency (Hz) of the voltage $V_c$ and the current $I_L$ in a case where a period in which the voltage $V_c$ at both ends of the capacitor C is zero is not present. When a capacitor C, which has capacitance $C_p$ that is obtained by substituting $f_t$ (that is, f) when t is zero in Equation (2) into Equation (1), is selected, a period in which the voltage $V_c$ at both ends of the capacitor C is zero is not present.

[Configuration of Frequency Setting Unit 180]

Returning to the description of FIG. 4, an example of a configuration of the frequency setting unit 180 will be described. The frequency setting unit 180 is a unit that sets the frequency (output frequency) of AC power to be supplied to the induction heating unit 20. To realize the function thereof, the frequency setting unit 180 includes an object-to-be-heated information acquiring unit 181, a frequency setting table 182, and a frequency selector 183.

The object-to-be-heated information acquiring unit 181 acquires attribute information of the steel strip 10 that is an object to be heated. For example, the object-to-be-heated information acquiring unit 181 acquires (receives) the attribute information from an external computer that is an input unit through a network, or acquires (input) the attribute information on the basis of information that is input by a user with respect to a user interface (one of input units) provided for the control unit 100. Here, the attribute information of the steel strip 10 is information that is capable of specifying a relative permeability, a resistance, and a sheet thickness of the steel strip 10. For example, the relative permeability, the resistance, and the sheet thickness itself of the steel strip 10 may be set as the attribute information, or in a case where the relative permeability, the resistance, and the sheet thickness itself of the steel strip 10 are determined according to specifications, a name (a trade name or the like) of the steel strip 10 having the specifications may be set as the attribute information.

The frequency selector 183 uses the attribute information acquired by the object-to-be-heated information acquiring unit 181 as a key and selects one frequency among frequencies registered in the frequency setting table 182. In the frequency setting table 182, the attribute information and the frequency are correlated with each other and are registered in advance.

Information of a frequency (output frequency) selected by the frequency selector 183 is transmitted to the gate control unit 140. The gate control unit 140 determines turn-on and turn-off (switching operation) timings of the respective gate terminals G1 to G4 of the semiconductor switches S1 to S4 of the MERS 130 so that AC power of the selected frequency is generated, and outputs an on-signal to a gate terminal of a semiconductor switch to be turned on. In this manner, the MERS 130 outputs the AC power of the frequency (the output frequency) that is set to the gate control unit 140 by the frequency setting unit 180 to the induction heating unit 20 as described above.

As described above, in this embodiment, the frequency (the output frequency) of the AC power to be supplied to the induction heating unit 20 is automatically determined in response to the relative permeability, the resistance, and the sheet thickness of the steel strip 10. This is based on a finding obtained through various experiments performed by the inventors, specifically, a finding that the temperature distribution (particularly, the temperature in the vicinity of an edge) of the steel strip 10 is affected by the frequency of the AC power supplied to the induction heating unit 20, the attribute information (the relative permeability, the resistance, and the sheet thickness) of the steel strip 10 that is an object to be heated, and a gap (distance between the upper side heating coil 24 and the lower side heating coil 28).

Hereinafter, the reason why this phenomenon occurs will be described.

First, a description will be made with respect to a case where the temperature of the steel strip 10 is equal to or higher than the Curie temperature.

When the steel strip 10 is at a temperature that is equal to or higher than the Curie temperature, a main magnetic field that is generated from the induction heating unit 20 penetrates through the steel strip 10, and an eddy current within the steel strip 10 (within a plane orthogonal to the sheet thickness) increases. This eddy current is repelled from a main magnetic field and is apt to be biased to the vicinity of the edge of the steel strip 10. Therefore, a high-temperature region is apt to occur in the vicinity of the edge of the steel strip 10.

Here, the eddy current within the steel strip 10 is proportional to a cross-sectional area (cross-sectional area including a sheet thickness direction) of the steel strip 10, such that in a case where the sheet thickness of the steel strip 10 is large, the cross-sectional area of the steel strip 10 becomes large and therefore the eddy current within the steel strip 10 increases.

In addition, the eddy current of the steel strip 10 is inversely proportional to a resistance of the steel strip 10, such that in a case where the resistance of the steel strip 10 is small, the eddy current within the steel strip 10 increases.

In addition, a frequency of AC power supplied to the induction heating unit 20 is proportional to an induced electromotive force that is generated within the steel strip 10 due to the main magnetic field generated from the induction heating unit 20. The eddy current of the steel strip 10 is proportional to the induced electromotive force, such that in a case where the frequency of the AC power supplied to the induction heating unit 20 is high, the eddy current within the steel strip 10 increases.

In addition, in a case where the gap is small, the main magnetic field generated from the induction heating unit 20 becomes large, such that the induced electromotive force generated within the steel strip 10 due to the main magnetic field becomes large and therefore the eddy current within the steel strip 10 increases.

Next, a description will be made with respect to a case where the temperature of the steel strip 10 is less than Curie temperature.

In a case where the temperature of the steel strip 10 is less than Curie temperature, a relative permeability of the steel strip 10 is large, such that the main magnetic field generated from the induction heating unit 20 is difficult to penetrate through the steel strip 10 and therefore bypasses the edge portion of the steel strip 10. As a result, in the vicinity of the edge of the steel strip 10 in the sheet width direction, the current density of the eddy current becomes large, and therefore a high temperature region occurs in the vicinity of the edge of the steel strip 10 in the sheet width direction.

As described above, factors (the frequency of the AC power supplied to the induction heating unit 20, the relative permeability, resistance, and sheet thickness of the steel strip 10 that is an object to be heated, and the gap), which have an effect on the temperature of the steel strip 10, are independent from each other. Among these factors, the relative permeability, resistance, and sheet thickness of the steel strip 10, and the gap are determined by operational conditions (hardware restrictions on a material that is an object to be heated and a facility). Therefore, in this embodiment, among these factors, "the frequency (the output frequency) of the AC power supplied to the induction heating unit 20" that can be controlled through on-line is changed using the frequency setting unit 180 to adjust the temperature of the steel strip 10.

In addition, as is the case with this embodiment, when all of the relative permeability, the resistance, and the sheet thickness of the steel strip 10, and the frequency are correlated with each other and are registered in the frequency setting table 182, the temperature distribution of the steel strip 10 in the sheet width direction can be adjusted in a relatively uniform manner. Therefore, it is preferable that all of the relative permeability, resistance, and sheet thickness of the steel strip 10, and the frequency be correlated with each other. However, it is not necessary to correlate all of the relative permeability, resistance, and sheet thickness of the steel strip 10, and the frequency, and at least one of the relative permeability, resistance, and sheet thickness of the steel strip 10 may be correlated with the frequency in the frequency setting unit 180. In addition, at least one of the relative permeability, resistance, and sheet thickness of the steel strip 10, and the gap may be correlated with the frequency.

[Configuration of Output Current Setting Unit 150]

The output current setting unit 150 is a unit that sets a magnitude (output current value) of the AC current $I_L$ supplied to the induction heating unit 20. To realize this function, the output current setting unit 150 includes an object-to-be-heated information acquiring unit 151, an output current setting table 152, and an output current selector 153.

The object-to-be-heated information acquiring unit 151 acquires attribute information of the steel strip 10 that is an object to be heated, similarly to the object-to-be-heated information acquiring unit 181.

The output current selector 153 uses the attribute information acquired by the object-to-be-heated information acquiring unit 151 as a key and selects one current value among current values registered in the output current setting table 152. In the output current setting table 152, the attribute information and the current value are correlated with each other and are registered in advance. In addition, a control angle of the rectifying unit 110 is set in response to a difference between the current value (the output current value) selected by the output current selector 153 and a current value measured by the current transformer 170. In the case of adopting a thyristor rectifying device as the rectifying unit 110, a gate firing angle of the thyristor is set. In this manner, the value of the current flowing to the induction heating unit 20 is fed back and the control angle (the gate firing angle) of the rectifying unit 110 is controlled, such that the value of the current flowing to the induction heating unit 20 may be constantly controlled to be the current value (output current value) selected by the output current selector 153. As a result, the power supply unit (the AC power supply 160 and the rectifying unit 110) supplies DC power to the MERS 130, and therefore the alternating current measured by the current transformer 170 can be adjusted to the current value (the output current value) set by the output current setting unit.

As described above, in this embodiment, the current value (the output current value) of the AC power supplied to the induction heating unit 20 is automatically determined in response to the relative permeability, resistance, and sheet thickness of the steel strip 10. This is because the current value corresponding to a target temperature can be determined by the relative permeability, the resistance, and the sheet thickness of the steel strip 10.

In addition, similarly to this embodiment, when all of the relative permeability, resistance, and sheet thickness of the steel strip 10, and the current value are correlated with each other and are registered in the output current setting table 152, a temperature distribution and an average temperature of the steel strip 10 in the sheet width direction may be set in a relatively appropriate manner. Therefore, it is preferable that all of the relative permeability, the resistance, and the sheet thickness of the steel strip 10, and the current value be correlated with each other. However, it is not necessary to correlate all of the relative permeability, resistance, and sheet thickness of the steel strip 10 with the current value, and at least one of the relative permeability, resistance, and sheet thickness of the steel strip 10 and the current value may be correlated with each other in the output current setting unit 150. In addition, at least one of the relative permeability, resistance, and sheet thickness of the steel strip 10, and the gap may be correlated with the current value.

Effect of this Embodiment

Figure 6A:
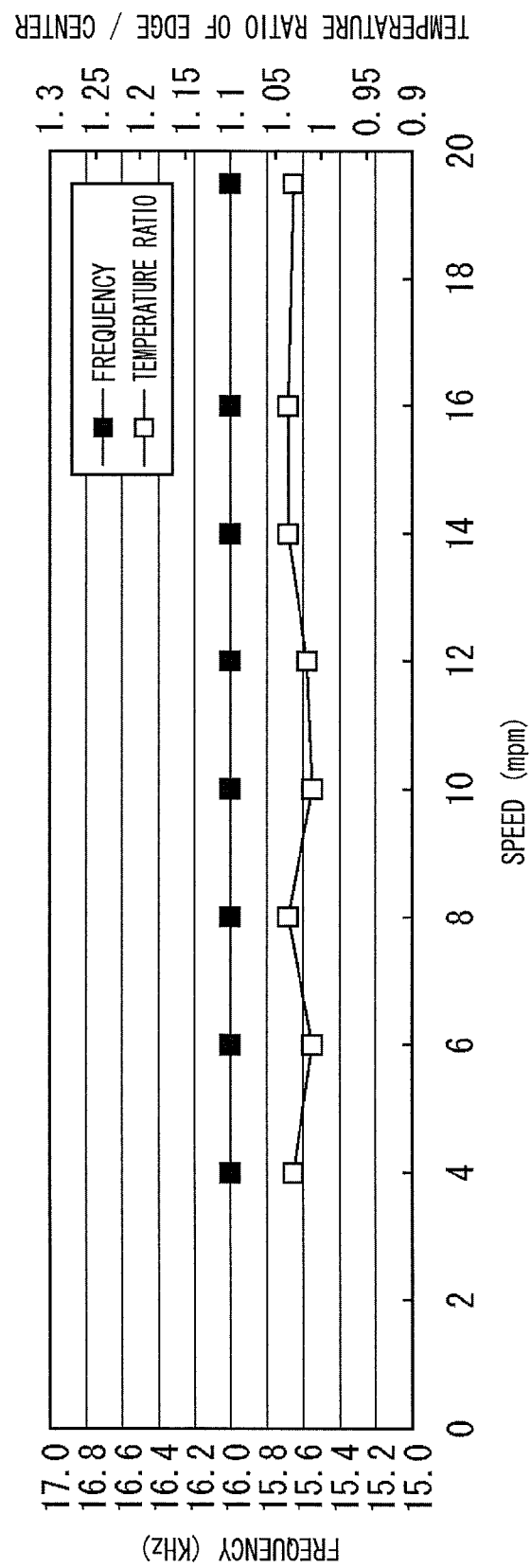
FIG. 6A is a graph illustrating the relationship between frequency and temperature ratio with respect to sheet conveyance speed, when power is supplied to the induction heating unit using the control unit according to the first embodiment of the present invention and a steel strip is heated.
Figure 6B:
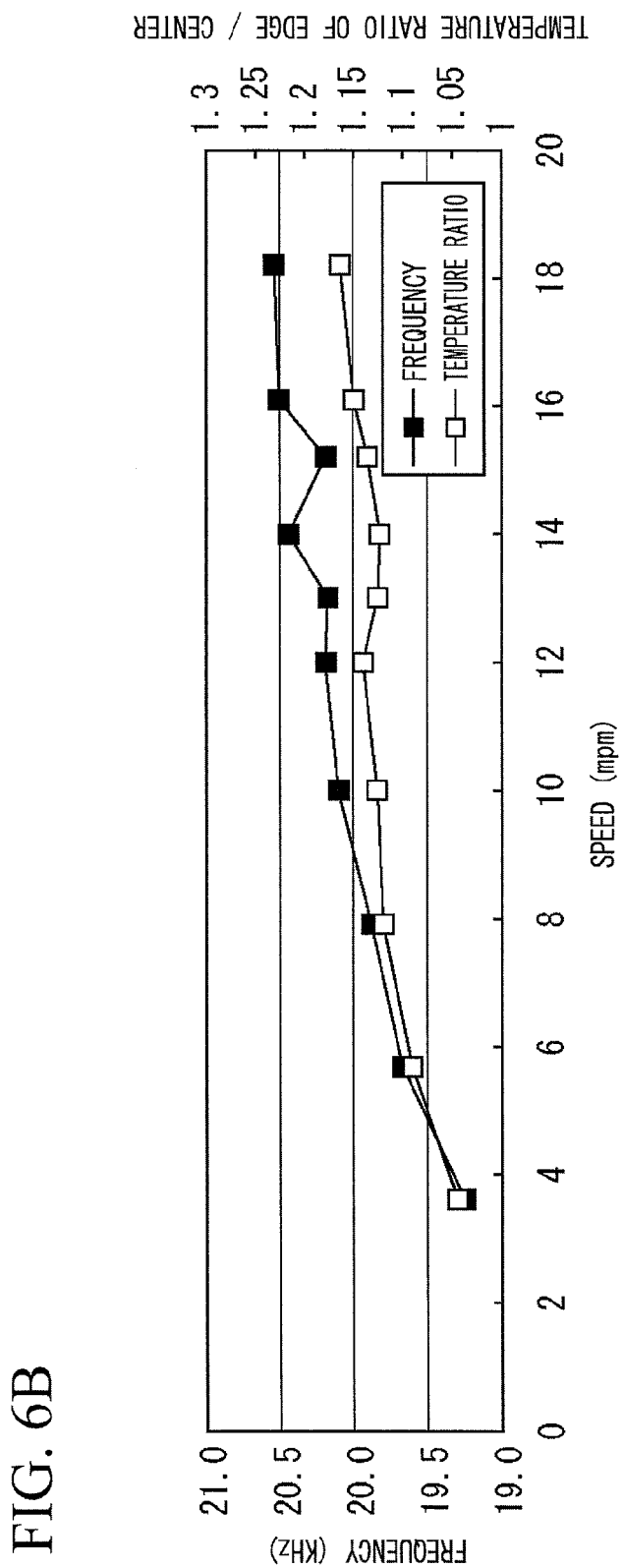
FIG. 6B is a graph illustrating the relationship between frequency and temperature ratio with respect to sheet conveyance speed, when power is supplied to the induction heating unit using a parallel resonance type inverter in a conventional technique and the steel strip is heated.

FIG. 6A shows a graph illustrating the relationship between frequency and temperature ratio with respect to sheet conveyance speed, when power is supplied to the induction heating unit 20 using the control unit 100 according to the embodiment and a steel strip 10 is heated. In addition, FIG. 6B shows a graph illustrating the relationship between frequency and temperature ratio with respect to a sheet conveyance speed, when power is supplied to the induction heating unit 20 using a parallel resonance type inverter in a conventional technique and the steel strip 10 is heated. Here, a temperature ratio (temperature ratio of edge/center) is a value obtained by dividing a temperature in an end portion (edge) of the steel strip 10 in the sheet width direction thereof by a temperature in a central portion of the steel strip 10 in the sheet width direction thereof. The more the value of the temperature ratio approaches 1, the more uniform the temperature distribution of the steel strip 10 in the sheet width direction is. In addition, the frequency is a frequency of a current applied to the induction heating unit 20. In addition, specifications of the steel strip 10 are as follows.

<Specifications of Steel Strip>
Material: Stainless steel sheet Sheet Thickness: 0.3 mm
Width: 500 mm As shown in FIG. 6A, when the control unit 100 according to this embodiment is used, even in a case where the sheet conveyance speed varies, the frequency of the current, which may be applied to the induction heating unit 20, may be held substantially constant, and therefore the temperature ratio can be controlled to be substantially constant.

On the other hand, when the sheet conveyance speed varies, the impedance of the load varies, such that in a case where the parallel resonance type inverter in the conventional technique is used, the inverter of the voltage source controls the output frequency of the inverter in such a manner that a resonance condition of the load is maintained. Therefore, as shown in FIG. 6B, the output frequency of the inverter varies in response to a variation of the impedance of the load. As a result thereof, the temperature ratio varies significantly and therefore the temperature ratio can not be controlled to be constant.

As described above, according to this embodiment, the current $I_L$ of the frequency (the output frequency) corresponding to the attribute (attribute information) of the steel strip 10 is supplied to the induction heating unit 20 using the MERS 130. Therefore, the control unit according to this embodiment is not subjected to a restriction in regard to an operation with a resonant frequency like the conventional technique, such that even when the sheet conveyance speed of the steel strip 10 varies, the frequency of the current $I_L$ that is supplied to the induction heating unit 20 may be set to a desired value in response to the attribute of the steel strip 10. Therefore, when the conductive sheet is heated using the transverse type induction heating unit, even when the sheet conveyance speed of the conductive sheet varies, it is possible to prevent the temperature distribution of the conductive sheet in the sheet width direction from being non-uniform. In addition, the current $I_L$ of a frequency, which is appropriate to the steel strip 10 that is an object to be heated (particularly, which makes the temperature distribution in the sheet width direction as uniform as possible), may be set to the induction heating unit 20.

In addition, in this embodiment, the control angle of the rectifying unit 110 is changed in response to the attribute of the steel strip 10, and therefore the current $I_L$ having a magnitude corresponding to the attribute of the steel strip 10 is supplied to the induction heating unit 20. As a result, the current $I_L$ having a magnitude appropriate to the steel strip 10 that is an object to be heated can flow through the induction heating unit 20. In addition, since the frequency is controlled to be constant, the temperature distribution of the conductive sheet in the sheet width direction can be uniformly controlled without actually measuring the variation in temperature with the passage of time at various positions of the steel strip 10.

Furthermore, in regard to the induction heating system provided with the control unit 100 and the induction heating unit 20 having the shielding plates 31a to 31d, since even when the sheet conveyance speed varies, the frequency of the AC power does not vary, it is not necessary to consider a variation (variation with the passage of time) in the eddy current generated at the edge portion of the steel strip 10. Therefore, when the control unit 100 is used in the induction heating system, even when the operational conditions vary, a heating amount in the vicinity of the edge can be appropriately controlled by the shielding plates 31a to 31d.

Second Embodiment

Next, a second embodiment of the present invention will be described. In the above-described first embodiment, the alternating current $I_L$ is made to flow to the induction heating unit 20 directly from the MERS 130. Conversely, according to this embodiment, the alternating current $I_L$ is made to flow to the induction heating unit 20 from the MERS 130 through a transformer. In this manner, in a configuration of this embodiment, the transformer is added to the above-described configuration of the first embodiment. Therefore, in this embodiment, the same reference symbols as those given in FIG. 1 to FIG. 6B will be given to the same portions as the above-described first embodiment, and a detailed description thereof will be omitted here.

Figure 7:
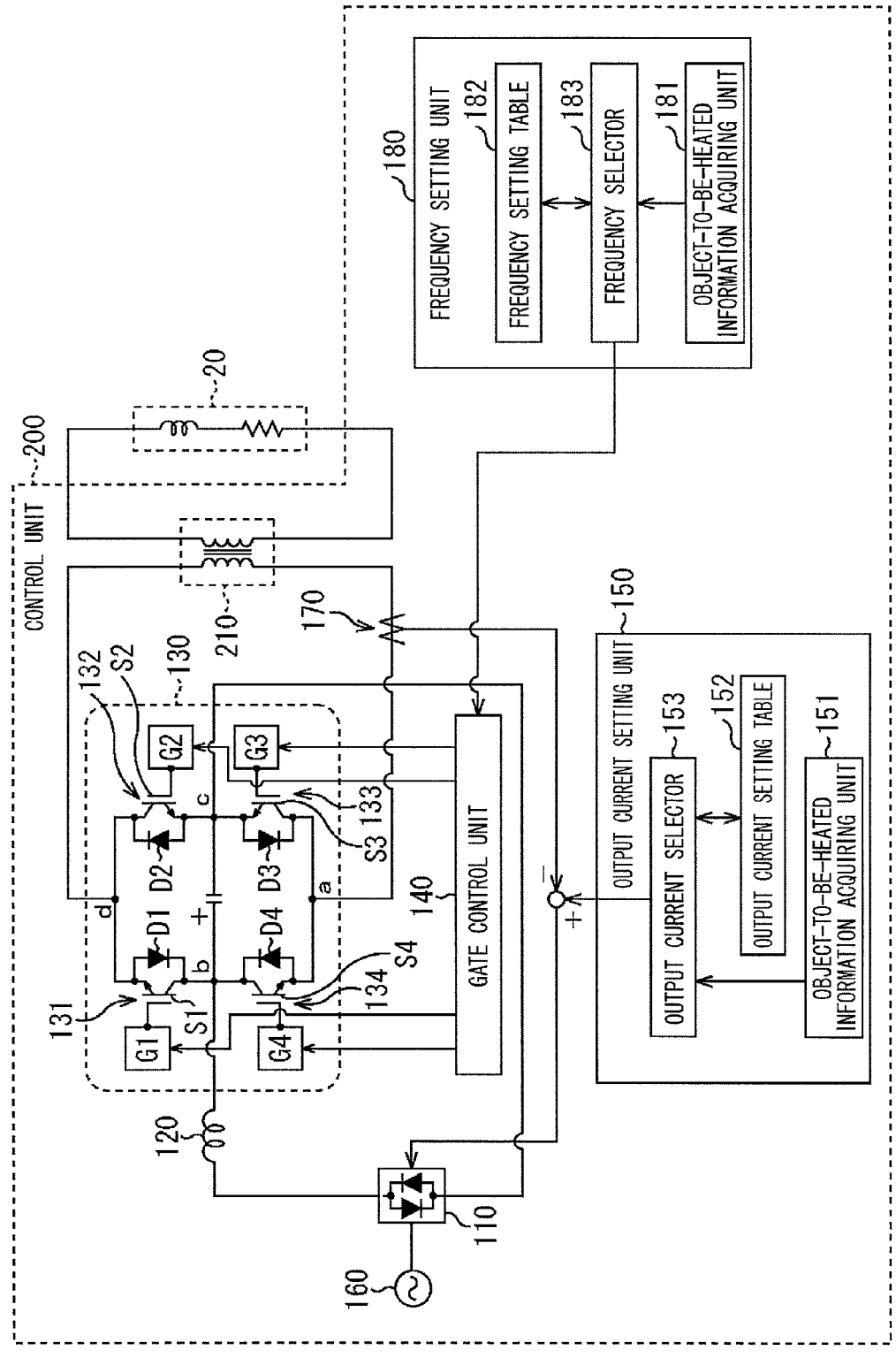
FIG. 7 is a view illustrating an example of a configuration of a control unit of an induction heating unit according to a second embodiment of the present invention.

FIG. 7 shows a view illustrating an example of a configuration of a control unit 200 of an induction heating unit.

As shown in FIG. 7, the control unit 200 according to this embodiment further includes an output transformer 210 compared to the control unit 100 according to the first embodiment shown in FIG. 4.

A primary side (input side) terminal of the output transformer 210 is connected to the AC terminals a and d of the MERS 130. A secondary side (output side) terminal of the output transformer 210 is connected to the induction heating unit 20 (the copper bus bars 42a and 42g). The transformation ratio (input:output) of the output transformer 210 is N:1 (N>1).

As described above, in this embodiment, since the output transformer 210 having the transformation ratio of N:1 (N>1) is disposed between the MERS 130 and the induction heating unit 20, substantially N times current of the current flowing through the MERS 130 can be made to flow to the induction heating unit 20. Therefore, in this embodiment, a large current can be made to flow to the induction heating unit 20 without making a large current flow to the "semiconductor switches S1 to S4 and the diodes D1 to D4" that make up the MERS 130.

In addition, a plurality of taps may be provided on the primary side or the secondary side of the output transformer 210 in such a manner that the transformation ratio of the output transformer 210 can be changed, and the tap to be used may be properly used in response to the steel strip 10 that is an object to be heated.

Third Embodiment

Next, a third embodiment of the present invention will be described. In the above-described first and second embodiments, a flat plate is used as the shielding plates 31a to 31d provided for the induction heating unit 20. Conversely, in this embodiment, a depressed portion is formed in the shielding plates provided for the induction heating unit 20. In this manner, this embodiment and the above-described first and second embodiments are different in a part of a configuration of the shielding plates. Therefore, in this embodiment, the same reference symbols as those given in FIG. 1 to FIG. 7 will be given to the same portions as the above-described first and second embodiments, and a detailed description thereof will be omitted here.

Figure 8A:
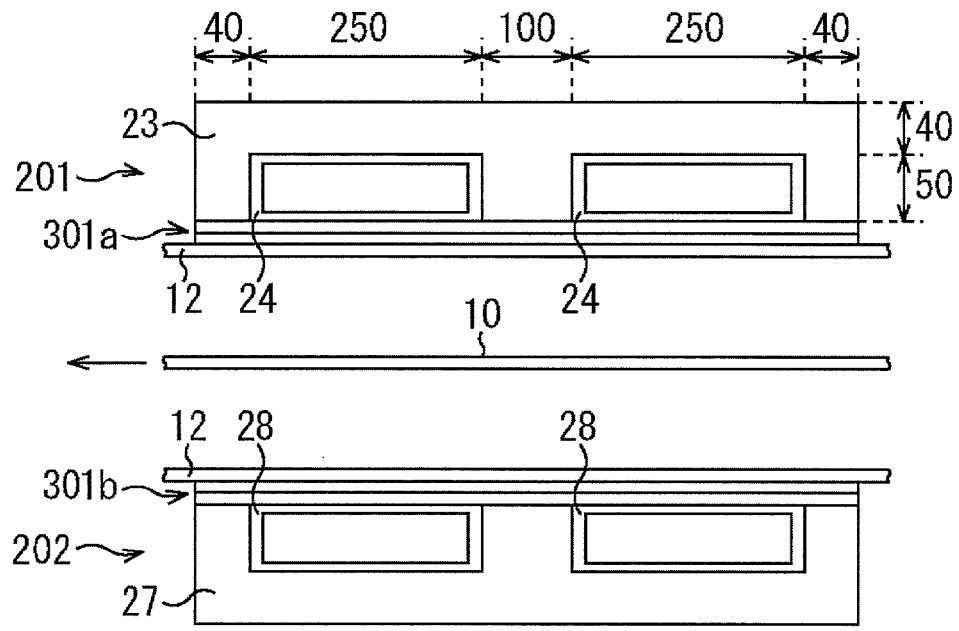
FIG. 8A is a longitudinal cross-sectional view illustrating an example of a configuration of an induction heating unit according to a third embodiment of the present invention.
Figure 8B:
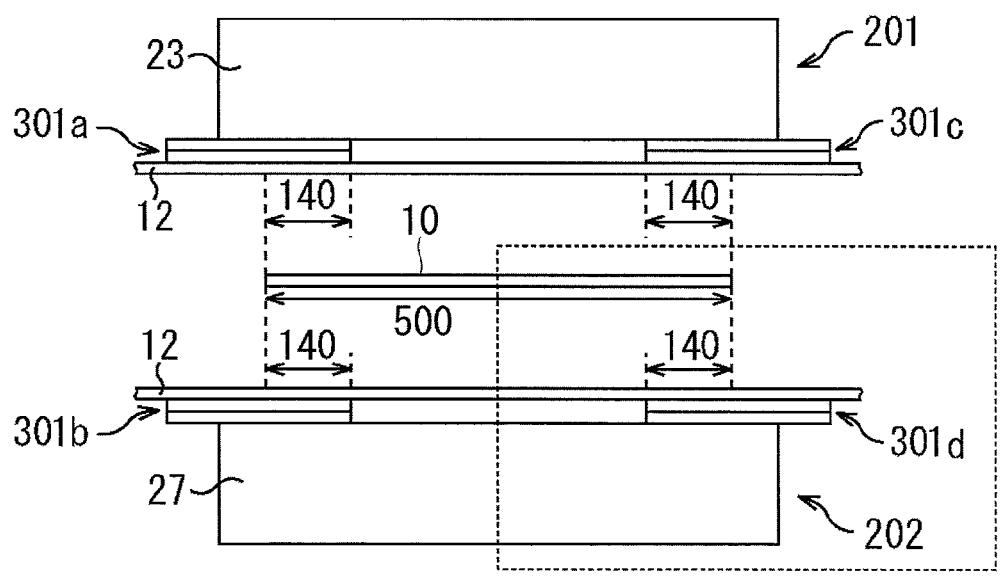
FIG. 8B is a longitudinal cross-sectional view illustrating an example of the configuration of the induction heating unit according to the third embodiment of the present invention.
Figure 8C:
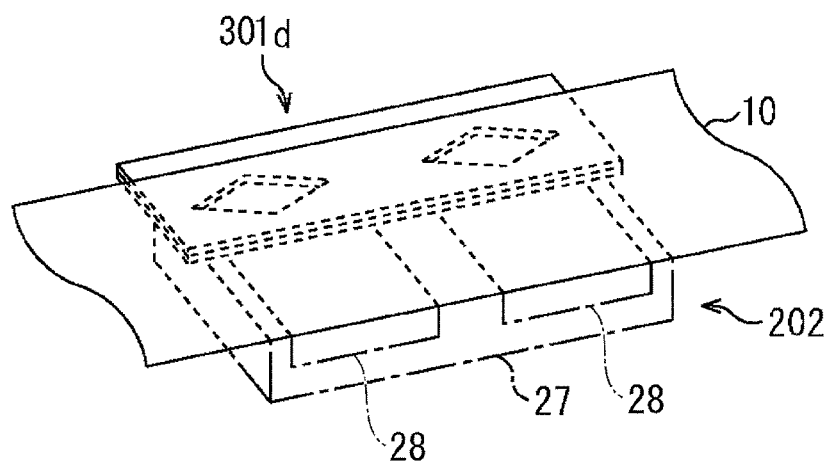
FIG. 8C is a partial perspective view illustrating an example of the configuration of the induction heating unit according to the third embodiment of the present invention.

FIGS. 8A to 8C show views illustrating an example of a configuration of the induction heating unit. FIG. 8A, FIG. 8B, and FIG. 8C correspond to FIG. 2A, FIG. 2B, and FIG. 2C, respectively. Instead of the shielding plates 31a to 31d shown in FIGS. 2A to 2C, shielding plates 301a to 301d are used. In addition, the shielding plates 301a to 301d are disposed at positions shown in FIG. 8B in such a manner that the depressed portion described later faces (is opposite to) the steel strip 10 (in the second container 12). In addition, the induction heating unit includes an upper side inductor 201 and a lower side inductor 202. In addition, the upper side inductor 201 and the lower side inductor 202 are substantially the same as the upper side inductor 21 and the lower side inductor 22 shown in FIGS. 2A to 2C, respectively, except for the configuration of the shielding plates.

Figure 9A:
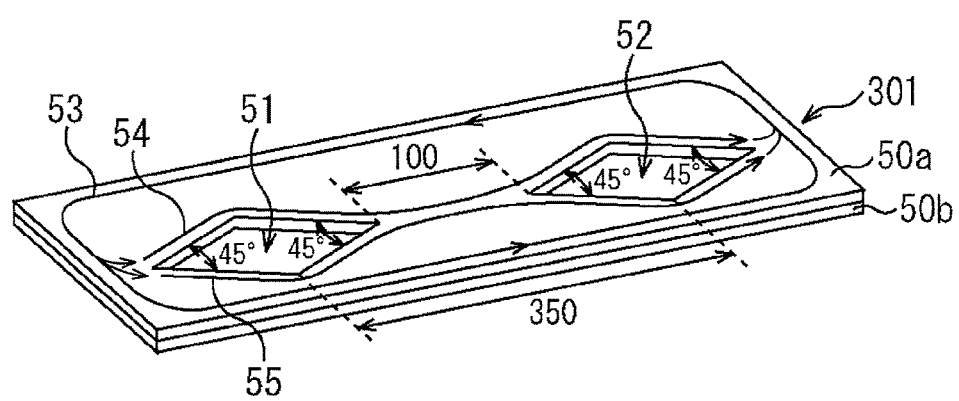
FIG. 9A is a view illustrating an example of a configuration of a shielding plate according to the third embodiment of the present invention.
Figure 9B:
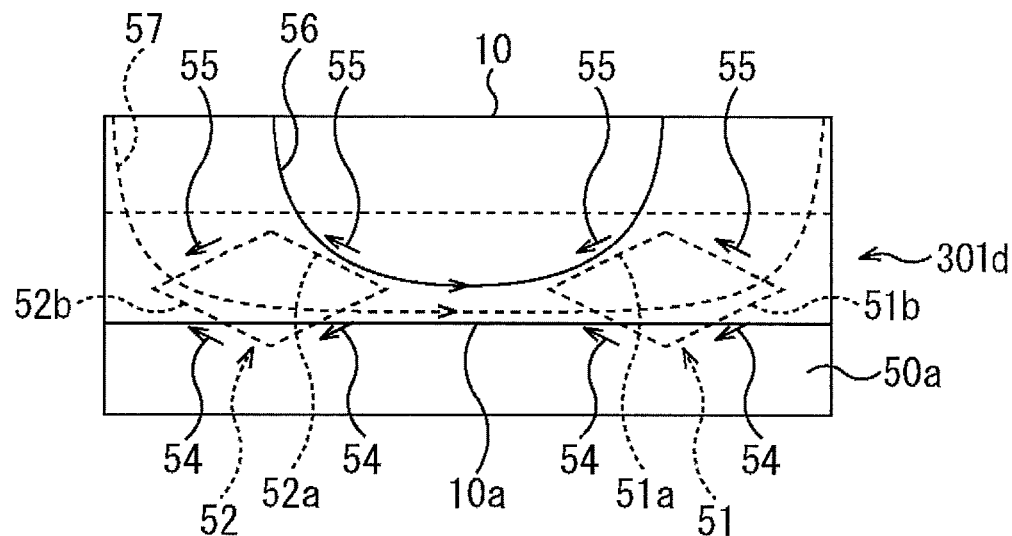
FIG. 9B is a schematic view illustrating an example of an eddy current that flows through a steel strip and the shielding plate according to the third embodiment of the present invention.
Figure 9C:
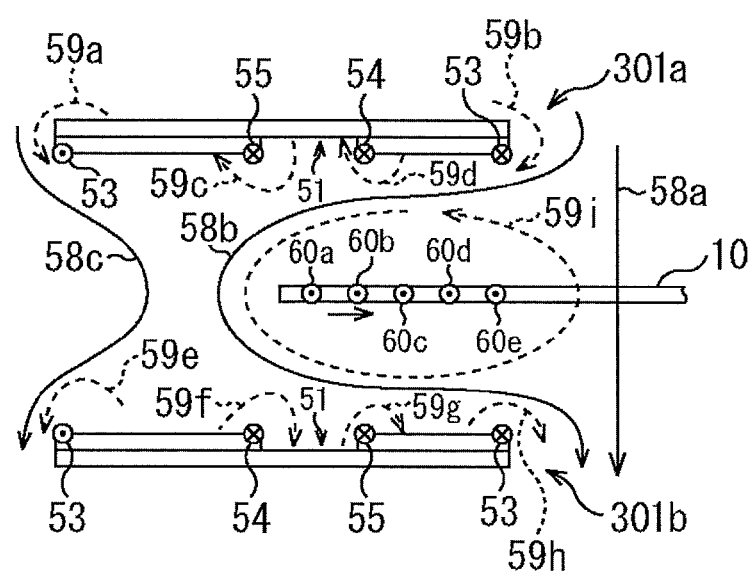
FIG. 9C is a schematic view illustrating an example of a magnetic field that is generated by the eddy current according to the third embodiment of the present invention.

In addition, FIGS. 9A to 9C show views illustrating an example of a configuration of the shielding plate 301 (shielding plates 301a to 301d). Specifically, FIG. 9A shows a perspective view taken by overlooking the shielding plate 301 from an upper side. In addition, FIG. 9B shows a view taken by overlooking a region of the shielding plate 301d shown in FIG. 8C from immediately above the steel strip 10. In addition, FIG. 9B shows only a portion that is necessary to explain a positional relationship between the steel strip 10 and the shielding plate 301d. In addition, FIG. 9C shows a schematic view illustrating an example of a magnetic field that is generated between the shielding plates 301a, 301b and the steel strip 10. However, in FIGS. 9B and 9C, the second container 12 is omitted for easy understanding of an effect of the shielding plates 301a to 301d.

As shown in FIG. 9A, the shielding plate 301 includes a main shielding plate 50a and a rear plate 50b.

The width and length of the main shielding plate 50a are the same as those of the rear plate 50b. However, the rear plate 50b is formed of a copper plate in which a longitudinal cross-section and a transverse cross-section are uniform, and conversely, the main shielding plate 50a is formed of a copper plate in which two rhombic holes are formed in the longitudinal direction thereof. The shielding plate 301 is formed by close contact between the main shielding plate 50a and the rear plate 50b, and has two rhombic depressed portions (non-penetration holes) 51 and 52 in the longitudinal direction. In addition, in FIG. 9A, dimensions [mm] related to the positions at which the depressed portions 51 and 52 are disposed are also indicated.

As shown in FIGS. 9B and 9C, the shielding plate 301 is installed on the bottom surface (slot side) of the core 23 and the top surface (slot side) of the core 27 in such a manner that a surface in which the depressed portions 51 and 52 are formed faces the steel strip 10.

In this embodiment, as shown in FIG. 9B, the depressed portions 51 and 52 of the shielding plate 301 (301d) and a sheet surface of the steel strip 10 are opposite to each other in the vicinity of an edge 10a of the steel strip 10 in the sheet width direction. Specifically, a region that is located on the edge 10a side compared to the maximum current passing region 56 faces the depressed portions 51 and 52 of the shielding plate 301. The region that is located on the edge 10a side includes a region between a maximum current passing region 56 that is a region in which an eddy current flowing through the steel strip 10 becomes maximum by operating the induction heating unit and the edge 10a of the steel strip 10.

Particularly, in this embodiment, inner-side edges 51a and 52a of the depressed portions 51 and 52 of the shielding plate 301 (301d) are disposed on the edge 10a side compared to the maximum current passing region 56, and outer-side edges 51b and 52b of the depressed portions 51 and 52 are disposed on the edge side 10a compared to an edge current passing region 57 that is a region through which an eddy current flowing to the vicinity of the edge 10a of the steel strip 10 passes. Here, among edges of the depressed portions 51 and 52, the inner-side edges 51a and 52a are edges that are closest to a central portion in the width direction of the steel strip 10 and that are closer to the corresponding depressed portions 52 and 51 (or the central portion of the shielding plate 301d in the sheet conveyance direction). In addition, among edges of the depressed portions 51 and 52, outer-side edges 51b and 52b are edges that are farther from the central portion of the steel strip 10 in the width direction and that are farthest from the corresponding depressed portions 52 and 51 (or the central portion of the shielding plate 301d in the sheet conveyance direction).

In this embodiment, due to the shielding plate 301 disposed as described above, a decrease in the temperature of the steel strip 10 in the vicinity of the edge 10a is suppressed. Hereinafter, a mechanism, which suppresses a decrease in temperature of the steel strip 10 in the vicinity of the edge 10a due to the shielding plate 301, will be described.

As shown in FIG. 9C, when the induction heating unit is operated, main magnetic fields 58a to 58c are generated, and therefore eddy currents 60a to 60e flow to an edge side of the steel strip 10 in the sheet width direction. In addition, a magnetic field 59i is generated by the eddy currents 60a to 60e. In addition, as shown in FIGS. 9A to 9C, eddy currents 53 to 55 flow through the shielding plate 301 (301a and 301b). The eddy current 53 is an eddy current flowing along a rhombic edge portion of the shielding plate 301 (main shielding plate 50a). On the other hand, the eddy currents 54 and 55 are currents flowing along an edge portion of the depressed portions 51 and 52 of the shielding plate 301. In this manner, in the shielding plate 301, the edge currents 53 to 55 flow to the rhombic edge portion of the shielding plate 301 and edge portion of the depressed portions 51 and 52 of the shielding plate 301 in a concentrated manner. Furthermore, magnetic fields 59a to 59h are generated by the eddy currents 53 to 55.

As a result, as shown in FIG. 9C, a repulsive force is generated between the eddy currents 54 and 55 that flow through the shielding plate 301 (301a and 301b) and the eddy current 60 that flows through the steel strip 10. Due to this repulsive force, the eddy current 60 (60a to 60e) flowing through the edge portion of the steel strip 10 moves to an inner side (in an arrow direction shown under the steel strip 10 in FIG. 9C) of the steel strip 10 and a current density in a region in which a temperature decreases in the conventional technique increases. Therefore, a decrease in temperature in the vicinity of the edge (region slightly to the inside of the edge) of the steel strip 10 may be suppressed, and therefore the shielding plate 301 can adjust the degree of electromagnetic coupling between a region of the steel strip 10 on the edge side in the sheet width direction and the heating coils 24 and 28. Here, the shielding plate 301 is made of copper, and a necessary property is maintained even at a high temperature. Therefore, even when the shielding plate 301 is exposed to high temperatures, a decrease in temperature of the steel strip 10 in the vicinity of the edge thereof can be suppressed.

Conversely, in a case the depressed portion is not present in the shielding plate 31 like the first embodiment, the eddy currents 53 and 54 do not flow through the shielding plate 31 as shown in FIGS. 9A and 9C, and an eddy current flows to the rhombic edge portion of the shielding plate 31 in a concentrated manner. Therefore, an eddy current that flows to the vicinity of the edge of the steel strip 10 does not receive a force biased to an inner side (central side) of the steel strip 10, and a current density of a region (region slightly to the inside of the edge of the steel strip 10) in which a temperature decreases does not increase. Therefore, a decrease in temperature in the vicinity of the edge of the steel strip 10 may not be suppressed.

As described above, the inventors found that when the depressed portions 51 and 52 are formed in the shielding plate 301 made of copper, and the shielding plate 301 is disposed in such a manner that the depressed portions 51 and 52 are opposite to the vicinity of the edge of the steel strip 10, a decrease in temperature in the vicinity of the edge of the steel strip 10 can be suppressed. To confirm this finding, the inventors measured the temperature distribution in the sheet width direction of a conductive sheet (corresponding to the steel strip 10) in a case where the shielding plate 301 according to this embodiment is used and in a case where the shielding plate 31 according to the first embodiment is used, respectively.

Figure 10A:
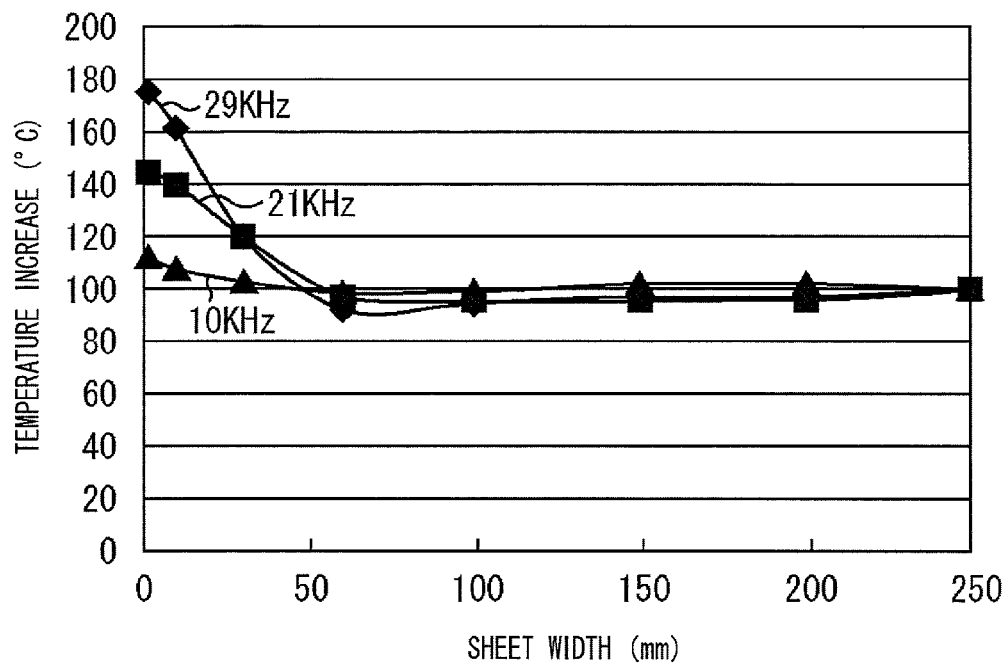
FIG. 10A is a view illustrating an example of a temperature distribution of a conductive sheet, which is heated by the induction heating unit, in the sheet width direction, in a case where the shielding plate according to the third embodiment of the present invention is used.
Figure 10B:
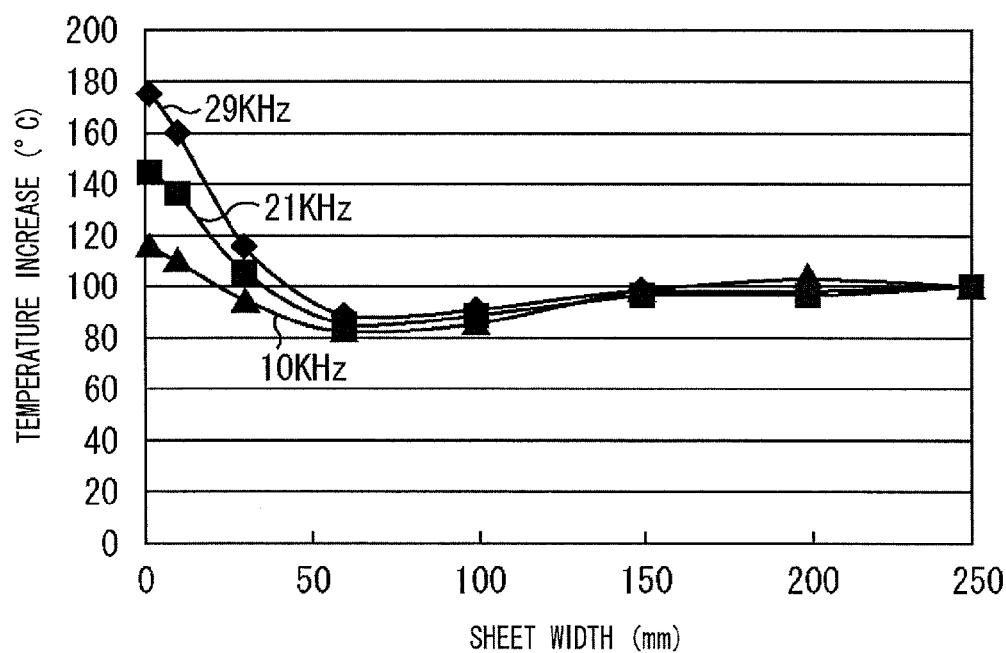
FIG. 10B is a view illustrating an example of a temperature distribution of a conductive sheet, which is heated by the induction heating unit, in the sheet width direction, in a case where a shielding plate according to the first embodiment of the present invention is used.

FIGS. 10A and 10B show views illustrating an example of a temperature distribution of a conductive sheet, which is heated by the induction heating unit, in the sheet width direction.

Specifically, FIG. 10A shows a graph with respect to the induction heating unit (the induction heating unit according to this embodiment) using the shielding plate 301 according to this embodiment. On the other hand, FIG. 10B shows a graph with respect to the induction heating unit (the induction heating unit according to the first embodiment) using the shielding plate 31 according to the first embodiment. In addition, the horizontal axis of graphs shown in FIGS. 10A and 10B indicates a position in the sheet width direction of the conductive sheet, a position "0" in the horizontal axis corresponds to an edge of the conductive sheet, and a position "250" corresponds to the center of the conductive sheet. On the other hand, the vertical axis represents an increase in temperature (temperature increase) of the conductive sheet due to heating. Here, experimental conditions of graphs shown in FIGS. 10A and 10B are as follows.

Width of heating coil: 250 [mm] (length in a sheet conveyance direction)

Core: Ferrite core

Heating material: Non-magnetic SUS (stainless) sheet (a width of 500 [mm], and a thickness of 0.3 [mm])

Sheet conveyance speed: 8 [mpm (m/minute)]

Heating temperature: 30 to 130 [° C.] (a temperature increase at a central portion is set to 100 [° C.])

Frequency of power source: 29 [kHz], 21 [kHz], and 10 [kHz]

Material of shielding plate: Copper

In addition, the closer the relative permeability of a material approaches 1, the more easily the temperature in the vicinity of an edge decreases. In addition, when the temperature of the conductive sheet (material to be heated) is equal to or higher than the Curie temperature, the relative permeability of the conductive sheet becomes 1. Therefore, the non-magnetic SUS (stainless) sheet was used as the heating material having the relative permeability of 1.

As shown in FIG. 10A, in the induction heating unit using the shielding plate 301 according to this embodiment, it can be understood that when the frequency is changed in the order of 29 [kHz]→21 [kHz]→10 [kHz], the temperature of the edge decreases, and a decrease in temperature in the vicinity of the edge (here, at a position of "50" to "100" in the horizontal axis) is suppressed (the temperature distribution in the sheet width direction becomes uniform).

On the other hand, as shown in FIG. 10B, in the induction heating unit using the shielding plate 31 according to the first embodiment, it can be understood that when the frequency is changed in the order of 29 [kHz]→21 [kHz]→10 [kHz], the temperature of the edge decreases, but the decrease in temperature in the vicinity of the edge (here, at a position of "50" to "100" in the horizontal axis) becomes large.

In addition, in a case where the shielding plate is not provided, the temperature in the vicinity of the edge (here, at a position of "50" to "100" in the horizontal axis) does not decrease. However, since the temperature increase in the edge becomes substantially 500 [° C.], the edge was overheated.

As described above, according to this embodiment, the depressed portions 51 and 52 are formed in the shielding plate 301 made of copper, the shielding plate 301 is disposed between the upper and lower side heating coils 24 and 28 and the steel strip 10 in such a manner that the depressed portions 51 and 52 face the vicinity of the edge of the steel strip 10. Therefore, even when the steel strip 10 is exposed to high temperatures, a decrease in temperature of the steel strip 10 in the vicinity of the edge thereof can be suppressed.

Furthermore, in the induction heating system provided with the control unit 100 and the induction heating unit having the shielding plate 301, even when the sheet conveyance speed varies, since the frequency of the AC power does not vary, it is not necessary to consider a variation (temporal variation) of the eddy current that is generated in the edge portion of the steel strip 10. Therefore, when the control unit 100 is used in the induction heating system, even when operational conditions vary, a temperature increase in the vicinity of the edge can be appropriately controlled by the shielding plate 301. Furthermore, since the depressed portions 51 and 52 are formed in the shielding plate 301, even when the relative permeability varies in response to a heated state of the steel sheet, the temperature distribution in the vicinity of the edge can be appropriately controlled due to the depressed portions 51 and 52. Therefore, in the configuration according to this embodiment, it is possible to cope with a change in heating speed in a relatively flexible manner.

In addition, in the above-described embodiments (the first embodiment to the third embodiment), the shielding plates 31 and 301 are not limited to a plate made of copper. That is, the shielding plates 31 and 301 may be formed by any material as long as this material is a conductor having a relative permeability of 1 (for example, metal that is a paramagnetic substance or a diamagnetic substance). For example, the shielding plate 31 may be formed of aluminum.

In addition, in this embodiment, the positional relationship between the steel strip 10 and the shielding plate 301 is not particularly limited as long as the depressed portions of the shielding plate 301 and the steel strip 10 (also including a plane extended from the steel strip 10) are opposite to each other in a region that is present on the edge 10a side compared to the maximum current passing region 56. However, it is preferable that a region between the maximum current passing region 56 and the edge 10a of the steel strip 10, and at least a part of the depressed portions of the shielding plate be opposite to each other as shown in FIG. 9B in order for a repulsive force to be reliably generated between the eddy current flowing through the shielding plate 301 and the eddy current flowing through the steel strip 10.

In addition, in this embodiment, a description has been made with respect to a case in which the two depressed portions are formed in the shielding plate as an example, but the number of the depressed portion formed in the shielding plate is not limited.

In addition, in this embodiment, an illustration has been made with respect to a case in which the shape of the depressed portions 51 and 52 is a rhombic shape as an example. However, the shape of the depressed portions 51 and 52 may be any shape as long as the eddy current may be made to flow through the steel strip 10 along the edge portion of the depressed portions 51 and 52. The shape of the depressed portions 51 and 52 may be, for example, an ellipse, a rectangle other than a rhombic shape, or other square shapes. At this time, when a depressed portion in which the length in the sheet conveyance direction is longer than that in a direction orthogonal to the sheet conveyance direction is formed, the eddy current can be easily made to flow along an edge portion of the depressed portion. Therefore, it is preferable to form a depressed portion in which the length in the sheet conveyance direction is longer than that in the direction orthogonal to the sheet conveyance direction. In addition, the shape of the depressed portion in the shielding plate is not necessary to have a closed shape. For example, the depressed portion may be formed in an end portion of the shielding plate.

Furthermore, copper is normally used for the upper side heating coil 24 and the lower side heating coil 28, but a conductor (metal) other than copper may be used. In addition, an induction heating system other than the continuous annealing line may be adopted. In addition, the dimensions of the cores 23 and 27 shown in FIG. 2A may be appropriately determined within a range in which the cores 23 and 27 are not magnetically saturated. Here, the generation of magnetic saturation in the cores 23 and 27 may be determined from magnetic field strength [A/m] that is calculated from the current flowing through the heating coils 24 and 28.

In addition, in the above-described embodiments, both of the upper side inductor 21 and the lower side inductor 22 are provided as an example, but either the upper side inductor 21 or the lower side inductor 22 may be provided. Furthermore, the size of the gap is not particularly limited.

In addition, all of the above-described embodiments of the present invention illustrate only a specific example for executing the present invention, and a technical scope of the present invention is not limited to the embodiments. That is, the present invention may be executed with various forms without departing from the technical scope or critical features thereof.

INDUSTRIAL APPLICABILITY

It is possible to provide a control unit of an induction heating unit, an induction heating system, and a control method of the induction heating unit, in which a temperature distribution in the sheet width direction of a conductive sheet is made more uniform compared to that in the conventional techniques, even when the sheet conveyance speed of the conductive sheet varies in a case where the conductive sheet is heated using a transverse type induction heating unit.

REFERENCE SYMBOL LIST

10: Steel strip (Conductive sheet)
20: Induction heating unit
23, 27: Core (Magnetic core)
24: Upper side heating coil (Heating coil)
28: Lower side heating coil (Heating coil)
31a to 31d: Shielding plate
51, 52: Depressed portion (Valley portion)
100, 200: Control unit of induction heating unit
110: Rectifying unit
120: Reactor
130: Magnetic energy recovery switch (MERS)
131 to 134: First to fourth reverse conductivity type semiconductor switches
140: Gate control unit
150: Output current setting unit
160: AC power supply
170: Current transformer (Current measuring unit)
180: Frequency setting unit
210: Output transformer
301: Shielding plate
S1 to S4: Semiconductor switches
D1 to D4: Diodes

What is claimed is:

1. A method of controlling an induction heating unit by controlling an AC power, which is output to a heating coil of a transverse type induction heating unit allowing an alternating magnetic field to intersect a sheet surface of a conductive sheet which is being conveyed to inductively heat the conductive sheet, the method comprising:
    outputting the AC power to the heating coil by a magnetic energy recovery switch;
    setting an output frequency from a plurality of output frequencies in response to at least one of a relative permeability, a resistivity, and a sheet thickness of the conductive sheet; and
    controlling a switching operation of the magnetic energy recovery switch on the basis of the output frequency from the plurality of output frequencies which is set.

2. The method of controlling the induction heating unit according to claim 1,
    wherein the output frequency is set by acquiring an attribute information which specifies the relative permeability, the resistivity, and the sheet thickness of the conductive sheet, and by selecting a frequency corresponding to the acquired attribute information as the output frequency with reference to a table in which the relative permeability, the resistivity, and the sheet thickness of the conductive sheet, and the frequency are correlated with each other and are registered in advance.

3. The method of controlling the induction heating unit according to claim 1,
    wherein an AC voltage which is output from the magnetic energy recovery switch is lowered by an output transformer, and the lowered AC voltage is output to the heating coil.

4. The method of controlling the induction heating unit according to claim 1, the method further comprising:
    setting an output current value in response to at least one of the relative permeability, the resistivity, and the sheet thickness of the conductive sheet;
    measuring an alternating current which flows to the induction heating unit; and
    supplying an DC power, which is necessary for adjusting an alternating current which is measured to the output current value which is set, to the magnetic energy recovery switch.

5. The method of controlling the induction heating unit according to claim 2,
    wherein an AC voltage which is output from the magnetic energy recovery switch is lowered by an output transformer, and the lowered AC voltage is output to the heating coil.

6. The method of controlling the induction heating unit according to claim 2, the method further comprising:

setting an output current value in response to at least one of the relative permeability, the resistivity, and the sheet thickness of the conductive sheet;

measuring an alternating current which flows to the induction heating unit; and supplying an DC power, which is necessary for adjusting an alternating current which is measured to the output current value which is set, to the magnetic energy recovery switch.

7. The method of controlling the induction heating unit according to claim 1, wherein the magnetic energy recovery switch includes, first and second AC terminals which are connected to one end and the other end of the heating coil, respectively, first and second DC terminals which are connected to an output terminal of the power supply unit, a first reverse conductivity type semiconductor switch which is connected between the first AC terminal and the first DC terminal, a second reverse conductivity type semiconductor switch which is connected between the first AC terminal and the second DC terminal, a third reverse conductivity type semiconductor switch which is connected between the second AC terminal and the second DC terminal, a fourth reverse conductivity type semiconductor switch which is connected between the second AC terminal and the first DC terminal, and a capacitor which is connected between the first and second DC terminals, the first reverse conductivity type semiconductor switch and the fourth reverse conductivity type semiconductor switch are connected in series in such a manner that conduction directions at the time of a switch-off become opposite to each other, the second reverse conductivity type semiconductor switch and the third reverse conductivity type semiconductor switch are connected in series in such a manner that conduction directions at the time of the switch-off become opposite to each other, the first reverse conductivity type semiconductor switch and the third reverse conductivity type semiconductor switch have the same conduction direction at the time of the switch-off as each other, the second reverse conductivity type semiconductor switch and the fourth reverse conductivity type semiconductor switch have the same conduction direction at the time of the switch-off as each other, and the AC power is output to the heating coil by controlling a switching operation time of the first and third reverse conductivity type semiconductor switches and a switching operation time of the second and fourth reverse conductivity type semiconductor switches on the basis of the output frequency which is set.

8. The method of controlling the induction heating unit according to claim 4, wherein the output current value is set by acquiring an attribute information which specifies the relative permeability, the resistivity, and the sheet thickness of the conductive sheet, and by selecting a current value corresponding to the acquired attribute information as the output current value with reference to a table in which the relative permeability, the resistivity, and the sheet thickness of the conductive sheet, and the current value are correlated with each other and are registered in advance.

9. The method of controlling the induction heating unit according to claim 2, wherein the magnetic energy recovery switch includes, first and second AC terminals which are connected to one end and the other end of the heating coil, respectively, first and second DC terminals which are connected to an output terminal of the power supply unit, a first reverse conductivity type semiconductor switch which is connected between the first AC terminal and the first DC terminal, a second reverse conductivity type semiconductor switch which is connected between the first AC terminal and the second DC terminal, a third reverse conductivity type semiconductor switch which is connected between the second AC terminal and the second DC terminal, a fourth reverse conductivity type semiconductor switch which is connected between the second AC terminal and the first DC terminal, and a capacitor which is connected between the first and second DC terminals, the first reverse conductivity type semiconductor switch and the fourth reverse conductivity type semiconductor switch are connected in series in such a manner that conduction directions at the time of a switch-off become opposite to each other, the second reverse conductivity type semiconductor switch and the third reverse conductivity type semiconductor switch are connected in series in such a manner that conduction directions at the time of the switch-off become opposite to each other, the first reverse conductivity type semiconductor switch and the third reverse conductivity type semiconductor switch have the same conduction direction at the time of the switch-off as each other, the second reverse conductivity type semiconductor switch and the fourth reverse conductivity type semiconductor switch have the same conduction direction at the time of the switch-off as each other, and the AC power is output to the heating coil by controlling a switching operation time of the first and third reverse conductivity type semiconductor switches and a switching operation time of the second and fourth reverse conductivity type semiconductor switches on the basis of the output frequency which is set.

10. The method of controlling the induction heating unit according to claim 6, wherein the output current value is set by acquiring an attribute information which specifies the relative permeability, the resistivity, and the sheet thickness of the conductive sheet, and by selecting a current value corresponding to the acquired attribute information as the output current value with reference to a table in which the relative permeability, the resistivity, and the sheet thickness of the conductive sheet, and the current value are correlated with each other and are registered in advance.

* * * * *